(12) United States Patent
Bodén

(10) Patent No.: US 10,358,955 B2
(45) Date of Patent: Jul. 23, 2019

(54) OIL PUMP ASSEMBLY FOR A VEHICLE LUBRICATION SYSTEM

(71) Applicant: VOLVO TRUCK CORPORATION, Göteborg (SE)

(72) Inventor: Roger Bodén, Kungsbacka (SE)

(73) Assignee: Volvo Truck Corporation, Göteborg (SE)

( * ) Notice: Subject to any disclaimer, the term of this patent is extended or adjusted under 35 U.S.C. 154(b) by 276 days.

(21) Appl. No.: 15/508,078

(22) PCT Filed: Jun. 16, 2015

(86) PCT No.: PCT/EP2015/063434
§ 371 (c)(1),
(2) Date: Mar. 1, 2017

(87) PCT Pub. No.: WO2016/055171
PCT Pub. Date: Apr. 14, 2016

(65) Prior Publication Data
US 2017/0306813 A1    Oct. 26, 2017

Related U.S. Application Data

(63) Continuation-in-part of application No. PCT/EP2014/025007, filed on Oct. 9, 2014.

(51) Int. Cl.
*F01M 1/16* (2006.01)
*F04B 49/035* (2006.01)
(Continued)

(52) U.S. Cl.
CPC .............. *F01M 1/16* (2013.01); *F01M 1/02* (2013.01); *F04B 49/035* (2013.01); *F04B 53/18* (2013.01); *F16K 17/046* (2013.01)

(58) Field of Classification Search
CPC .......... F01M 1/16; F01M 1/02; F04B 49/035; F04B 53/18; F16K 17/046
See application file for complete search history.

(56) References Cited

U.S. PATENT DOCUMENTS 3,841,803 A * 10/1974 Morgan ................. F01C 21/04
123/196 R
4,556,078 A * 12/1985 Wittren ................... B62D 5/07
137/118.06
(Continued)

FOREIGN PATENT DOCUMENTS

CN       102644777 A    8/2012
CN       103375672 A    10/2013
(Continued)

OTHER PUBLICATIONS

International Search Report (dated Sep. 11, 2015) for corresponding International App. PCT/EP2015/063434.
(Continued)

*Primary Examiner* — Michael A Riegelman
(74) *Attorney, Agent, or Firm* — WRB-IP LLP

(57) ABSTRACT

An oil pump assembly is provided for a vehicle lubrication system including a pumping device, the oil pump assembly presenting an outlet leading from the pumping device, and an inlet leading to the pumping device, the oil pump assembly further including a relief valve presenting a valve chamber arranged to communicate via an outlet relief passage with the outlet, and to communicate via a relief deposit passage with a relief deposit location, the relief valve further including a plunger located in the valve chamber, the plunger being movable between a closed position, in which communication between the outlet relief passage and the relief deposit passage is prevented, and an open position, in which communication between the outlet relief passage and the relief deposit passage is provided, the oil pump assembly further including a control valve for controlling the relief valve, and a control passage adapted to provide a communication between the outlet and the control valve via the valve chamber.

34 Claims, 17 Drawing Sheets

(51) Int. Cl.
  *F04B 53/18* (2006.01)
  *F01M 1/02* (2006.01)
  *F16K 17/04* (2006.01)

(56) References Cited

U.S. PATENT DOCUMENTS

| | | | | |
|---|---|---|---|---|
| 4,609,331 A * | 9/1986 | Duffy | ................ | B62D 6/02 |
| | | | | 180/423 |
| 5,058,626 A * | 10/1991 | Takaoka | ................ | B62D 5/087 |
| | | | | 137/625.66 |
| 5,111,660 A * | 5/1992 | Gettel | ................ | F04C 14/26 |
| | | | | 60/468 |
| 5,253,672 A * | 10/1993 | Uehara | ................ | F15B 11/08 |
| | | | | 137/489 |
| 5,273,297 A * | 12/1993 | Gerdes | ................ | B60G 17/056 |
| | | | | 137/625.61 |
| 5,471,838 A * | 12/1995 | Suzuki | ................ | B62D 6/02 |
| | | | | 180/421 |
| 5,547,349 A * | 8/1996 | Kimura | ................ | F01M 1/16 |
| | | | | 417/282 |
| 5,651,665 A * | 7/1997 | Can | ................ | F04B 49/24 |
| | | | | 417/300 |
| 6,267,094 B1 * | 7/2001 | Kuettner | ................ | F01M 1/02 |
| | | | | 123/196 A |
| 6,488,479 B1 | 12/2002 | Berger | | |
| 7,165,950 B2 * | 1/2007 | Fenny | ................ | F04B 1/2042 |
| | | | | 137/130 |
| 7,588,011 B2 * | 9/2009 | Ono | ................ | F04C 2/102 |
| | | | | 123/196 R |
| 7,674,095 B2 * | 3/2010 | Hunter | ................ | F01C 11/002 |
| | | | | 417/220 |
| 7,739,943 B2 * | 6/2010 | Wong | ................ | B60T 13/162 |
| | | | | 91/516 |
| 7,765,915 B2 * | 8/2010 | Davison | ................ | B60T 13/162 |
| | | | | 91/518 |
| 7,779,744 B2 * | 8/2010 | Wong | ................ | B60T 13/161 |
| | | | | 91/516 |
| 8,267,121 B2 * | 9/2012 | Gruel | ................ | F16K 11/0716 |
| | | | | 137/1 |
| 9,562,504 B2 * | 2/2017 | Tanabe | ................ | F02M 63/0245 |
| 2002/0172604 A1 * | 11/2002 | Berger | ................ | F01M 1/16 |
| | | | | 417/307 |
| 2006/0171818 A1 * | 8/2006 | Kato | ................ | F01M 1/16 |
| | | | | 417/302 |
| 2010/0192898 A1 * | 8/2010 | Ni | ................ | F01M 1/16 |
| | | | | 123/196 R |
| 2014/0007836 A1 * | 1/2014 | Miyajima | ................ | F01M 3/00 |
| | | | | 123/196 R |
| 2014/0060477 A1 * | 3/2014 | Watanabe | ................ | F01M 1/16 |
| | | | | 123/196 R |
| 2014/0190444 A1 * | 7/2014 | Inoue | ................ | F01M 1/16 |
| | | | | 123/196 R |
| 2015/0000629 A1 * | 1/2015 | Boden | ................ | F01M 1/02 |
| | | | | 123/196 A |
| 2015/0167514 A1 * | 6/2015 | Miyajima | ................ | F01M 5/007 |
| | | | | 417/292 |
| 2016/0108781 A1 * | 4/2016 | Miyajima | ................ | F01M 1/02 |
| | | | | 137/565.11 |
| 2016/0290335 A1 * | 10/2016 | Cuneo | ................ | F04C 2/3442 |
| 2017/0044939 A1 * | 2/2017 | Watanabe | ................ | F16K 17/0473 |
| 2017/0114682 A1 * | 4/2017 | Miyajima | ................ | F04C 14/26 |
| 2017/0306813 A1 * | 10/2017 | Boden | ................ | F04B 49/035 |

FOREIGN PATENT DOCUMENTS

| | | |
|---|---|---|
| DE | 10051131 A1 | 5/2001 |
| DE | 102012112879 A1 | 6/2014 |
| WO | 2012100344 A1 | 8/2012 |

OTHER PUBLICATIONS

Chinese Official Action (dated Jan. 3, 2019) for corresponding Chinese App. 201580054355.1.

* cited by examiner

OIL PUMP ASSEMBLY FOR A VEHICLE LUBRICATION SYSTEM

BACKGROUND AND SUMMARY

The invention relates to an oil pump assembly for a vehicle lubrication system comprising a pumping device and a relief valve arranged to communicate with a pump outlet and with a relief deposit location. The invention also relates to an internal combustion engine system comprising an internal combustion engine and an oil pump assembly, a method of controlling an oil pump assembly, a computer program, a computer readable medium, and a controller.

Traditional vehicle oil pumps may be driven via a belt or a gear assembly by the crankshaft of the vehicle internal combustion engine. Such oil pumps might in some operational situations deliver more pressure than is required by the devices served by the pump. For example, at cold starts a primary object of an engine lubrication system could be for the oil to increase its temperature, and hence its efficiency as quickly as possible. Therefore, at cold starts it might be desirable for oil to reside longer than usual at the lubricated devices, such as engine bearings, and to not be replaced at a relatively high rate by cold oil from the pump. Delivering more pressure than is required by the lubricated devices, e.g. at certain engine speeds and loads, also entails excessive energy consumption by the oil pump.

Systems have been developed to vary the pressure of the oil provided to the lubricated devices of the engine. For example, U.S. Pat. No. 5,339,776 discloses an oil pump which draws oil from an oil sump, and a valve which can divert oil supplied by the oil pump back into the oil sump without routing the oil to the lubricated devices.

U.S. Pat. No. 6,488,479 suggests that where high pressure oil is dumped back into the sump, aeration of the oil may occur, and the oil dumped back to the sump might experience significant heat loss. Said U.S. Pat. No. 6,488,479 discloses a pressure release valve which has a spring loaded plunger, and can redirect a portion of the flow that exits an outlet port of an oil pump back to an inlet port of the pump. A plunger adjustment mechanism is provided in the form of a solenoid subassembly that includes a housing and a solenoid winding. When the solenoid winding is energized, the plunger moves so as to provide communication between the outlet and inlet ports. Such a solenoid winding needs to work against the spring force, and introduces an undesired increase of complexity of the oil pump. Said U.S. Pat. No. 6,488,479 alternatively suggests, with reference to FIG. 4, providing the plunger adjustment mechanism similar to a hydraulic actuator, with a "head" serving as an actuation piston, which is provided in a housing, forming a seal with the piston. On opposite sides of the piston the housing is provided with apertures for fluid communication for the piston actuation. Also in this alternative the plunger adjustment mechanism needs to work against the spring force, and therefore needs to be sized therefore. Further, the hydraulic actuation needs an arrangement which is relatively complex and sensitive to wear, e.g. due to the seal between the piston and the housing.

It is desirable to provide an energy efficient, yet simple and reliable manner of varying the pressure of oil provided to the lubricated devices of a vehicle engine.

According to an aspect of the invention, an oil pump assembly is provided for a vehicle lubrication system comprising a pumping device, the oil pump assembly presenting an outlet leading from the pumping device, and an inlet leading to the pumping device, the oil pump assembly further comprising a relief valve presenting a valve chamber arranged to communicate via an outlet relief passage with the outlet, and to communicate via a relief deposit passage with a relief deposit location, the relief valve further comprising a plunger located in the valve chamber, the plunger being movable between a closed position, in which communication between the outlet relief passage and the relief deposit passage is prevented, and an open position, in which communication between the outlet relief passage and the relief deposit passage is provided, the oil pump assembly further comprising a control valve for controlling the relief valve, characterised in that it comprises a control passage adapted to provide a communication between the outlet and the control valve via the valve chamber.

The pumping device can be provided in any suitable form, for example as a gear pump, a gerotor pump or a rotary vane pump. As understood, the oil pump assembly outlet allows oil pumped by the pumping device out of the oil pump assembly, e.g. to an oil filter before proceeding to lubricated engine devices and an oil sump. As also understood, the inlet of the oil pump assembly can allow oil to the pumping device, e.g. from the oil sump. It should be noted that in the closed position, the plunger might block the outlet relief passage and/or the relief deposit passage. Also, in the open position, the outlet relief passage and the relief deposit passage may be exposed to the valve chamber.

Thus, the invention provides for a control passage providing a communication between the outlet and the control valve via the valve chamber. The control passage extending via the valve chamber of the relief valve provides in a simple manner the possibility of using the pressure in the pump outlet to adjust the actuation of the plunger and thereby control the relief valve. Compared to known art this provides a simplified and more durable relief valve control arrangement with fewer parts. Thus an effective oil pump output pressure control is provided with only a small increase of the complexity of the lubrication system. Further the invention can be implemented on a traditional oil pump of any sort, so that a simple and durable pump can be used.

The oil pump assembly may comprise a pump body housing the pumping device, the pump body presenting the outlet leading from the pumping device, and the inlet leading to the pumping device.

Preferably, the control valve is configured to communicate, e.g. via a control pressure deposit passage, with a control pressure deposit location, whereby the control valve is arranged to control a communication between the outlet and the control pressure deposit location via the valve chamber. Preferably, the control pressure deposit location is provided in the inlet. Thereby, oil used for control of the relief valve will be transported back to the inlet of the oil pump, which reduces the energy consumed by the pump. Alternatively, the control pressure deposit location can be provided in an oil sump of the lubrication system.

In some embodiments, the outlet relief passage and the control passage are configured to communicate with the valve chamber on opposite sides of the plunger. Opposite sides of the plunger preferably means opposite sides of the plunger in the direction of movement of the plunger in the valve chamber. This means that a pressure in the outlet can be, when the control valve prevents communication between the valve chamber and the control pressure deposit location, distributed to one side of the plunger via the outlet relief passage and to the opposite side of the plunger via the control passage. The interface between the valve chamber and the relief deposit passage can be provided laterally to the direction of movement of the plunger. For example, where the valve chamber is cylindrical, the interface between the valve chamber and the relief deposit passage can be provided in the cylindrical surface of the valve chamber. Thereby, in the closed position the plunger can block the relief deposit passage. Further, the interface between the valve chamber and the outlet relief passage can be provided in an end portion of the valve chamber. Thereby, the relief valve is arranged so that a pressure via the outlet relief passage can exert an opening force on the plunger towards the open position thereof. In the open position the relief deposit passage can be exposed to the valve chamber.

In some embodiments, the relief valve is configured so that the plunger can be urged from the closed position to the open position by pressure in the control passage. Thereby, the control passage can present an outlet control passage portion connecting the outlet with the valve chamber. The interface between the valve chamber and the outlet control passage portion can be provided in an end portion of the valve chamber. Thereby, the plunger is configured to be urged from the closed position to the open position by pressure in the outlet control passage portion.

The control passage can be configured to communicate with the valve chamber on opposite sides of the plunger. Thereby, when the control valve prevents communication between the outlet and the control pressure deposit location, the outlet pressure will be provided on both sides of the plunger by the control passage, when the plunger is in the closed position. On the other hand, when the control valve allows communication between the outlet and the control pressure deposit location, and the pressure in the control pressure deposit location is lower than in the outlet, the pressure will fall at a side of the plunger which is then in communication with the control pressure deposit location. Thereby a pressure difference will occur across the plunger so that it is moved towards the open position.

In some embodiments, the relief valve is arranged so that a communication is provided in the valve chamber between opposite sides of the plunger. Thereby, a portion of the control passage can be provided in the valve chamber and provide a communication between opposite sides of the plunger. This provides for other portions of the control passage to communicate with the valve chamber on opposite sides of the plunger, as suggested above. Thus, in such embodiments, at least a part of the communication provided by the control passage between the outlet and the control valve, is provided in the valve chamber between opposite sides of the plunger.

The communication in the valve chamber between opposite sides of the plunger can be provided by a bore in the plunger. For example, where the plunger has a cylindrical external surface, the bore could be centrally located in the plunger and straight in the direction of movement of the plunger between the closed and open positions. Alternative arrangements are possible for providing the communication in the valve chamber between opposite sides of the plunger. For example, a groove could be provided in the external surface of the plunger or in the surface of the valve cavity.

In some embodiments, the outlet relief passage is provided by the control passage. Thereby, the outlet relief passage and the control passage can be provided together in a joint conduit, which simplifies the design of the oil pump assembly. The interface between the valve chamber and the combined outlet relief passage and control passage is advantageously provided in an end portion of the valve chamber.

In some embodiments, the plunger presents a recessed portion between two end portions of the plunger, so as to provide with the valve chamber an intermediate space between the end portions. The two end portions is preferably aligned in the direction of movement between the open and closed positions. Where the relief valve is configured so that the plunger can be urged from the closed position to the open position by pressure in the control passage, the interface between the valve chamber and the outlet relief passage can, similarly to the interface between the valve chamber and the relief deposit passage, be provided laterally to the direction of movement of the plunger. For example, where the valve chamber is cylindrical, the interface between the valve chamber and the outlet relief passage, as well as the interface between the valve chamber and the relief deposit passage, can be provided in the cylindrical surface of the valve chamber. Thereby, the relief valve may be configured so that in the closed position, the plunger blocks, with one or both of the end portions, the outlet relief passage and/or the relief deposit passage, and in the open position, the outlet relief passage and the relief deposit passage may be exposed to the intermediate space.

Preferably, the relief valve comprises an elastic element, which may be provided as a spring. The elastic element can be configured to exert a closing force on the plunger towards the closed position. Thereby, the plunger is biased by the elastic element towards the closed position. The relief valve can be arranged so that a pressure via the outlet relief passage and/or the outlet control passage portion can exert an opening force against the closing force of the elastic element, (the outlet control passage portion being a part of the control passage connecting the outlet with the valve chamber). Thereby, said pressure can tend to move the plunger towards the open position. For example, the elastic element and an interface between the valve chamber and the outlet control passage portion and/or the outlet relief passage can be located on opposite sides of the plunger.

Preferably, the plunger is configured to delimit a subspace of the valve chamber, in which subspace the elastic element is located. It is understood that the size of the subspace varies due to plunger movement. Preferably, where the control valve is configured to communicate with a control pressure deposit location, the control valve is arranged to control a communication between the outlet and the control pressure deposit location via the subspace. The control passage extending via the relief valve subspace, which is delimited by the plunger, and in which the elastic element is located, provides an effective and simple manner of using the pressure difference between the pump outlet and the control pressure deposit location to adjust the actuation of the plunger and thereby control the relief valve. As stated, the control pressure deposit location is advantageously provided in the pump inlet.

When the control valve is controlled so as to isolate the control pressure deposit location from the subspace, the pressure in the subspace will be that of the outlet. As a result, the pressure on both sides of the plunger will be equal, and when there is an over-pressure in the outlet, this will assist the elastic element in urging the plunger to the closed position. By selective control by the control valve, the control passage can provide the communication between the outlet and the control pressure deposit location via the subspace. This will decrease the pressure in the subspace, and as a result, the opening force from the outlet pressure can move the plunger against the closing force of the spring towards the open position.

Where the elastic element is provided in the form of a spring, with a given spring strength, it is possible to regulate the relief valve with a higher pressure than in said FIG. 4 solution in U.S. Pat. No. 6,488,479. This is because the pump outlet pressure acts on the spring side of the relief valve plunger when the control valve is closed. To accomplish this in said solution in U.S. Pat. No. 6,488,479, the spring has to be increased, which will require that the energy needed to regulate a reduction of the pressure of the pump outlet needs to be increased.

Preferably, the control valve is not arranged to isolate the outlet from the valve chamber. Thus, where the control passage presents an outlet control passage portion connecting the outlet with the valve chamber, preferably the control valve is not located along the outlet control passage portion.

Preferably, the plunger presents a recessed portion between two end portions of the plunger so as to provide the valve chamber with an intermediate space between the end portions, wherein the plunger is configured to delimit, on one side of the plunger, a subspace in the valve chamber, and, opposite to the subspace, a pressure space in the valve chamber, and wherein the control valve is arranged to communicate with the subspace, and the relief valve is arranged so that a communication is provided in the valve chamber between the intermediate space and the pressure space Thereby, the outlet relief passage may be arranged to communicate with the intermediate space in the valve chamber. This is advantageous since it allows the outlet relief passage to extend from the valve chamber perpendicularly from the latter. This in turn allows the outlet relief passage to be provided as a straight conduit, which simplifies manufacturing of the oil pump assembly. The reason is that the conduit can be provided without angles which may complicate machining of a work piece from which a body housing the relief valve is manufactured.

Preferably, the communication between the intermediate space and the pressure space is provided by at least one cavity in the plunger. The cavity is preferably elongated. The cavity may be provided as a bore in the plunger and/or as an elongated recess on the plunger surface forming a conduit with the surface of the valve chamber.

Preferably, the at least one cavity providing the communication between the intermediate space and the pressure space extends in parallel with a direction of movement of the plunger in the valve chamber. This is advantageous since it allows for a plurality of such cavities, provided, e.g. as bores and/or elongated recesses, in one of the end portions of the plunger and radially outside of the intermediate portion, to be parallel. This, in turn, facilitates manufacturing of the plunger, since the latter can be kept in the same orientation during machining of said cavities.

Preferably, at least one of the at least one cavity providing the communication between the intermediate space and the pressure space extends perpendicularly to a direction of movement of the plunger in the valve chamber. Preferably said cavity extending perpendicularly to a direction of movement of the plunger in the valve chamber, extends through the intermediate section of the plunger.

The communication provided in the valve chamber between the intermediate space and the pressure space is particularly advantageous where the outlet relief passage is provided by the control passage. More specifically, the relief valve may be arranged so that a communication is provided in the valve chamber between opposite sides of the plunger, and the outlet relief passage may be provided by the control passage.

Thus, the outlet relief passage and an outlet control passage portion may be combined into a single conduit between the pump outlet and the relief valve. Also, the outlet relief passage may communicate with the valve chamber at a location between ends of the cylinder presented by the valve chamber. It is understood that the communication in the valve chamber between opposite sides of the plunger is a communication between the pressure space and the subspace. This communication can be direct, or indirect, e.g. via the intermediate space. It is also understood that the outlet relief passage communicates with the intermediate space in the closed position of the plunger.

Combining the outlet relief passage and the control passage into a single conduit between the pump outlet and the relief valve simplifies manufacturing of the oil pump assembly, since machining steps for providing a conduit can be omitted. In addition, since the combined outlet relief passage and control passage may communicate with the valve chamber at a location between side ends of the cylinder presented by the valve chamber, the combined outlet relief passage and control passage may be manufactured as a straight conduit, preferably extending perpendicularly to the valve chamber main extension. This further simplified manufacturing, since no angle need to be provided in the combined outlet relief passage and control passage.

It is understood that the valve chamber may present an elongated, preferably cylindrical, shape, and the plunger may be adapted to move in the longitudinal direction of the valve chamber.

The communication in the valve chamber between opposite sides of the plunger may be provided by one or more cavities in the plunger. For example, the communication between the intermediate space and the pressure space, and the communication between opposite sides of the plunger are provided by at least one cavity, preferably at least two cavities, e.g. bores or recesses, in the plunger.

Said cavities may be provided in the end portions of the plunger, radially outside the recessed portion of the plunger. Thereby the communication in the valve chamber between opposite sides of the plunger is provided by combination of the communication between the intermediate space and the pressure space and a communication between the intermediate space and the subspace. Said cavities are preferably elongated and parallel, mutually as well as with the valve chamber.

In some embodiments, said cavities include at least one cavity extending in a longitudinal direction of the valve chamber, from the pressure space to the subspace, and at least one cavity extending through the recessed portion of the plunger, transversely to and intersecting said at least one cavity extending in the longitudinal direction of the valve chamber.

Preferably, at least one of the at least one cavity providing the communication between intermediate space and the subspace is a bore with a diameter of 0.5-5.0 mm, preferably 2.0-3.0 mm. Thereby, the bore(s) is/are large enough to prevent congestion of debris, but small enough to keep the flow through them relatively small.

Preferably, the relief deposit location is provided in the inlet. Thereby, the recirculated oil will be transported back to the inlet of the oil pump, which substantially reduces the energy consumed by the pump. It should be noted however that the invention is applicable to lubrication systems where the relief deposit location is provided elsewhere, for example in the oil sump.

Preferably, the control valve is a proportional valve. This further simplifies and increases the reliability of the solution for controlling the relief valve.

Preferably, the assembly according comprises a pump body housing the pumping device, the pump body presenting the outlet leading from the pumping device, and the inlet leading to the pumping device, wherein the control valve is spatially located externally of the pump body the control valve. In many lubrication systems the oil pump is located in or at the oil sump, which can provide a harsh environment with high temperatures, oil mist, etc. When locating the control valve externally of the pump body, or even remotely from the pump body, the pump body can be located in or at the oil sump, and the control valve can be located externally of the oil sump. This makes it possible to provide a location for the control valve at which it is not subjected to the environment of the oil sump. In turn, this makes it possible to use a valve without consideration for it having to withstand said environment, which simplifies and reduces the cost for the assembly.

It should be noted that the relief valve is preferably located in the pump body. However, alternatively, the relief valve can be located externally of the pump body.

According to another aspect of the invention, an internal combustion engine system is provided comprising an internal combustion engine and an oil pump assembly according to any embodiment of the invention, wherein the control valve is mounted externally on a vehicle engine comprising lubricated devices served by the oil pump assembly. This makes it possible to provide the control valve at a location in which it is easy to access, for example for service or replacement.

According to another aspect of the invention, a method is provided of controlling an oil pump assembly according to any embodiment of the invention, comprising determining a value of a lubrication parameter indicative of the operation of the vehicle lubrication system, and controlling, at least partly based on the determined lubrication parameter value, the control valve so as to control the communication between the outlet and the control pressure deposit location via the subspace.

According to another aspect of the invention, a computer program is provided comprising program code means for performing the steps of said method of controlling an oil pump assembly when said program is run on a computer. According to another aspect of the invention, a computer readable medium carrying is provided a computer program comprising program code means for performing the steps of said method of controlling an oil pump assembly when said program product is run on a computer. In addition, according to another aspect of the invention, a controller is provided being configured to perform the steps of said method of controlling an oil pump assembly.

DESCRIPTION OF DRAWINGS

Below embodiments of the invention will be described with reference to the drawings in which.

DETAILED DESCRIPTION

Figure 1:
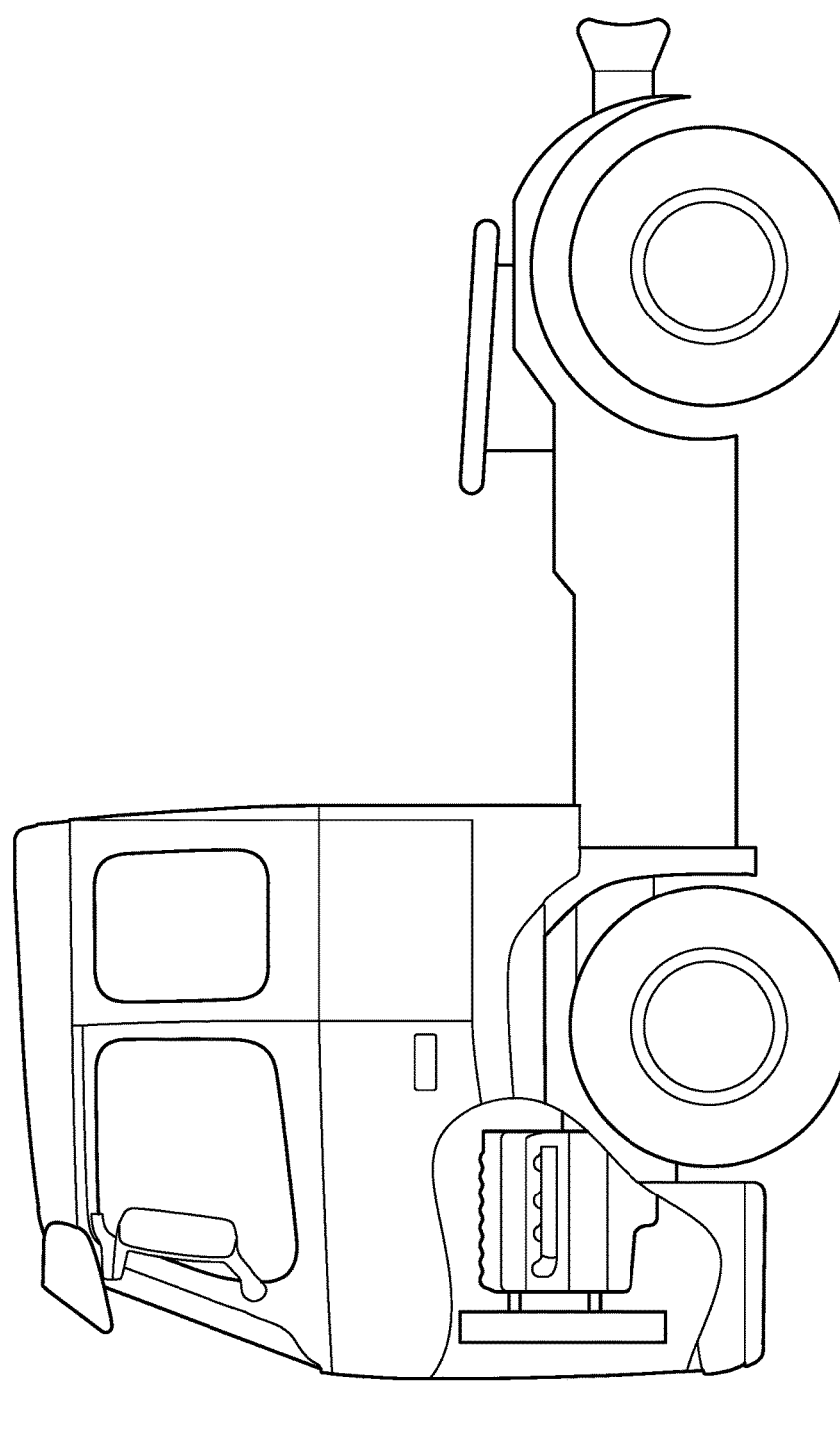
FIG. 1 shows a vehicle with an oil pump assembly according to an embodiment of the invention.
Figure 2:
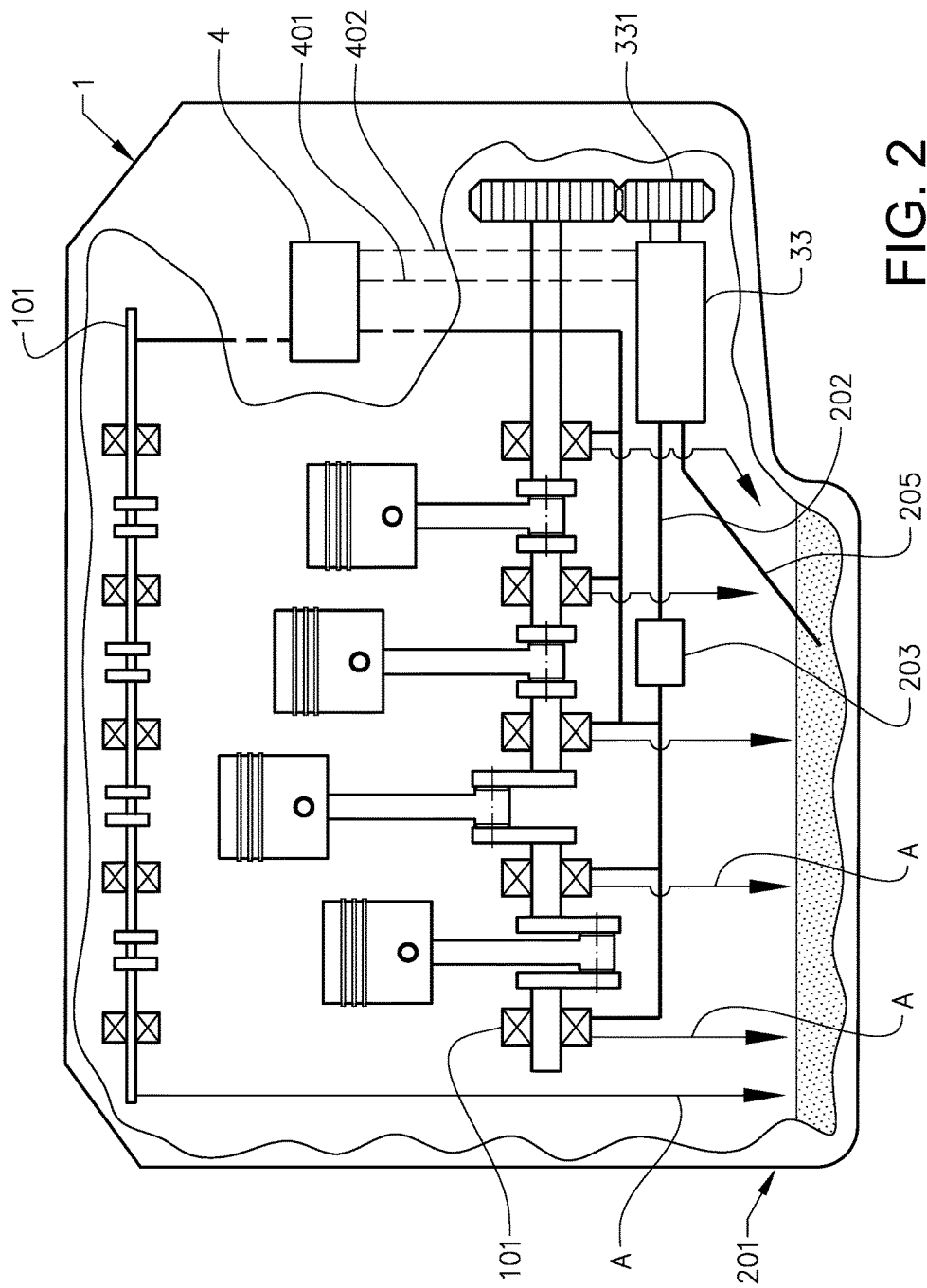
FIG. 2 is a partly sectioned side view of an internal combustion engine system in the vehicle in FIG. 1, with some hidden parts indicated with broken lines.

FIG. 1 shows a vehicle in the form of a truck comprising a lubrication system described below. As can be seen in FIG. 2, an internal combustion engine system of the vehicle comprises an internal combustion engine 1 and a lubrication system with an oil sump 201 located at the lower part of the engine 1. An oil pump assembly for the lubrication system comprises an oil pump 33, located in the oil sump 201, and a control valve 4, closer described below. The oil pump 33 is arranged to receive oil from the oil sump via a distribution conduit 205, and to supply oil via a supply conduit 202 and an oil filter 203 to lubricated devices 101 of the engine 1, such as bearings at a crankshaft and camshafts of the engine. From the lubricated devices 101 the oil is returned to the oil sump 201 as indicated by the arrows A. The oil pump 33 is configured to be driven by the crankshaft via a gear arrangement 331.

As described closer below, the control valve 4 is mounted to the exterior of the engine 1, relatively far up along the engine, so that it can be easily accessed for service or replacement. As also described closer below, a control passage 401 and a control pressure deposit passage 402 connects the oil pump body and the control valve 4.

Figure 3:
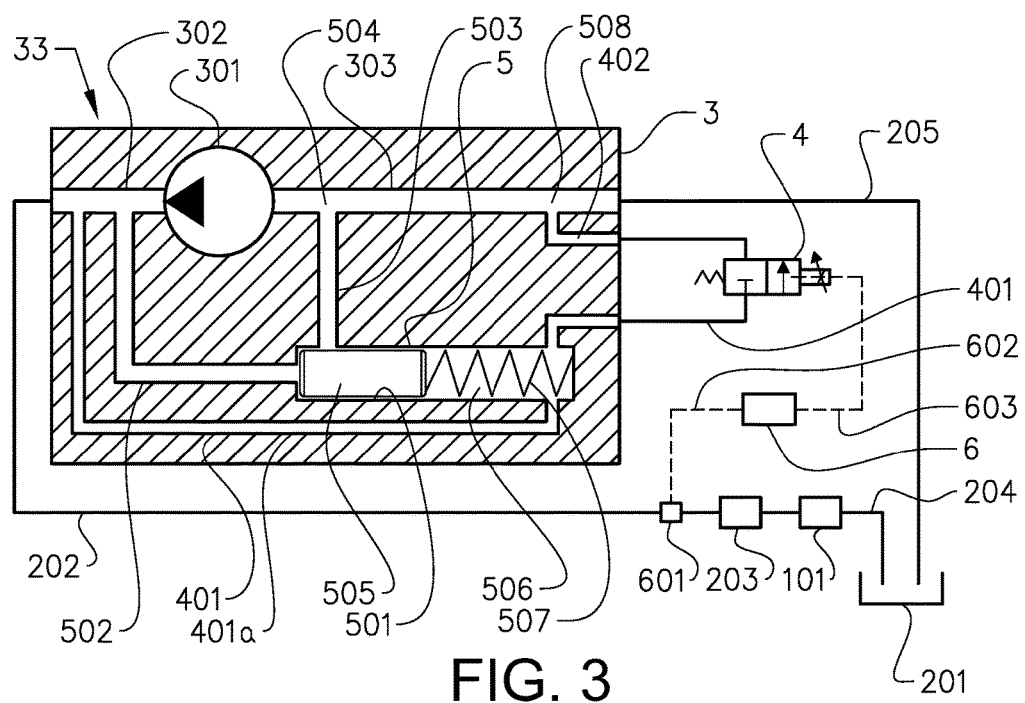
FIG. 3 shows the oil pump assembly and devices with which it is adapted to interact with, FIG. 4 shows the oil pump assembly in FIG. 3 with a shifted position of a control valve therein.

Reference is made to FIG. 3. The oil pump 33 comprises a pump body 3 houses a pumping device 301. The pump body 3 presents an outlet 302 leading from the pumping device, and an inlet 303 leading to the pumping device. The pumping device 301 can be a gear pump, a gerotor pump, a rotary vane pump, or of any other suitable pump type. The distribution conduit 205 provides oil from the oil sump 201 to the inlet 303. The outlet 302 guides oil to the supply conduit 202, which as stated leads via the oil filter 203, to the lubricated devices 101 of the engine 1. From the lubricated devices 101 one or more return conduits 204 may guide the oil to the oil sump 201.

The oil pump assembly further comprising a relief valve 5 hosed in the pump body 3. The relief valve 5 presents a valve chamber 501 arranged to communicate via an outlet relief passage 502 with the outlet 302. The valve chamber 501 is also arranged to communicate via a relief deposit passage 503 with a relief deposit location 504 in the inlet 303.

Figure 4:
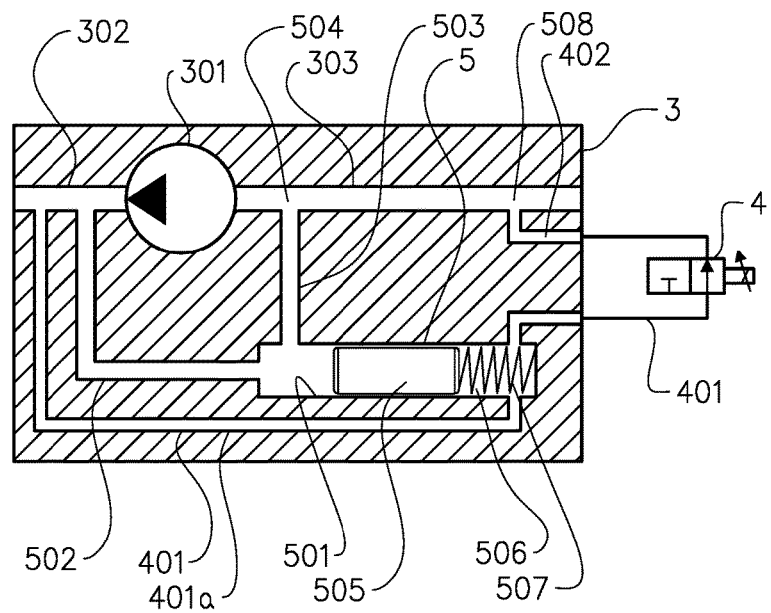

The relief valve 5 further comprises a plunger 505 located in the valve chamber 501, the plunger 505 being movable between a closed position and an open position. The valve chamber 501 and the plunger 505 have cylindrical shapes. In the closed position of the plunger 505, shown in FIG. 3, communication between the outlet relief passage 502 and the relief deposit passage 503 is prevented. In the open position, the plunger 505 is moved to the right as illustrated in FIG. 4, and communication between the outlet relief passage 502 and the relief deposit passage 503 is provided.

The plunger 505 delimits a subspace 506 of the valve chamber 501. In the subspace an elastic element in the form of a compression helical spring 507 is located. The spring 507 exerts a closing force on the plunger 505 towards the closed position. The relief valve 5 is arranged so that a pressure in the outlet relief passage 502 can exert an opening force against the closing force of the spring.

The control passage 401 provides a communication between the outlet 302 and the control valve 4 via the subspace 506. Further, the control valve 4 communicates with a control pressure deposit location 508, in this embodiments provided in the inlet 303. Thus, the control valve 4 is arranged to control a communication between the outlet 302 and the inlet 303 via the subspace 506. In this embodiment, the control valve 4 is provided in the form of a proportional valve 4. It should be noted that the control valve 4 is not located along an outlet control passage portion 401a of the control passage 401, connecting the outlet 302 with the subspace 506.

The engine comprises an electronic control unit 6 arranged to control various actuators in the engine based on inputs, e.g. from sensors, on various operation parameters, such as the engine speed and the engine load. In the supply conduit 202 of the lubrication system, there is an oil temperature sensor and an oil pressure sensor, commonly indicated in FIG. 3 with the reference numeral 601. As understood, the oil temperature and the oil pressure are lubrication parameters indicative of the operation of the vehicle lubrication system. As indicated with the broken line 602, the control unit 6 receives from the temperature and pressure sensors 601 values of the oil temperature and pressure. Based at least partly on these values, the control unit 6 controls, as indicated with the broken line 603, the control valve 4 so as to control the communication between the outlet 302 and the inlet 303 via the subspace 506.

In FIG. 3 the control valve 4 in a position in which communication between the control passage 401 and the control pressure deposit passage 402 is blocked. This means that the pressure in the subspace 506 is equal to that of the outlet. As a result, the pressure on both sides of the plunger 505 is equal, and when there is an over-pressure in the outlet 302, the spring will add an extra force to the plunger 505 towards the closed position.

In FIG. 4 the control unit 6 has controlled the control valve 4 so that it is shifted in a position in which communication between the control passage 401 and the control pressure deposit passage 402 is allowed. It is understood that in the closed position the plunger blocks the relief deposit passage 503, while in the open position the relief deposit passage 503 is exposed to the valve chamber 501. This control action of the control unit 6 of shifting the control valve position may have been done upon a determined value of a lubrication parameter passing a threshold value; for example, the oil pressure sensed by the sensor 601 might be above a threshold value for the oil pressure.

As can be seen in FIG. 4, since communication between the control passage 401 and the control pressure deposit passage 402, and thereby communication between the outlet 302 and the inlet 303 via the subspace 506 is allowed, the pressure in the subspace 506 is decreased, and as a result, the opening force from the outlet pressure in the outlet relief passage 502 moves the plunger 505 against the closing force of the spring 507 towards the open position. It can be seen that the size of the subspace 506 varies due to plunger movement.

In other words, when the outlet 302 has a higher pressure than the inlet 303, opening with the control valve 4 the connection between the subspace 506 and the inlet 303 will provide a pressure difference across the plunger 505, which will urge it to move to the open position.

Figure 5:
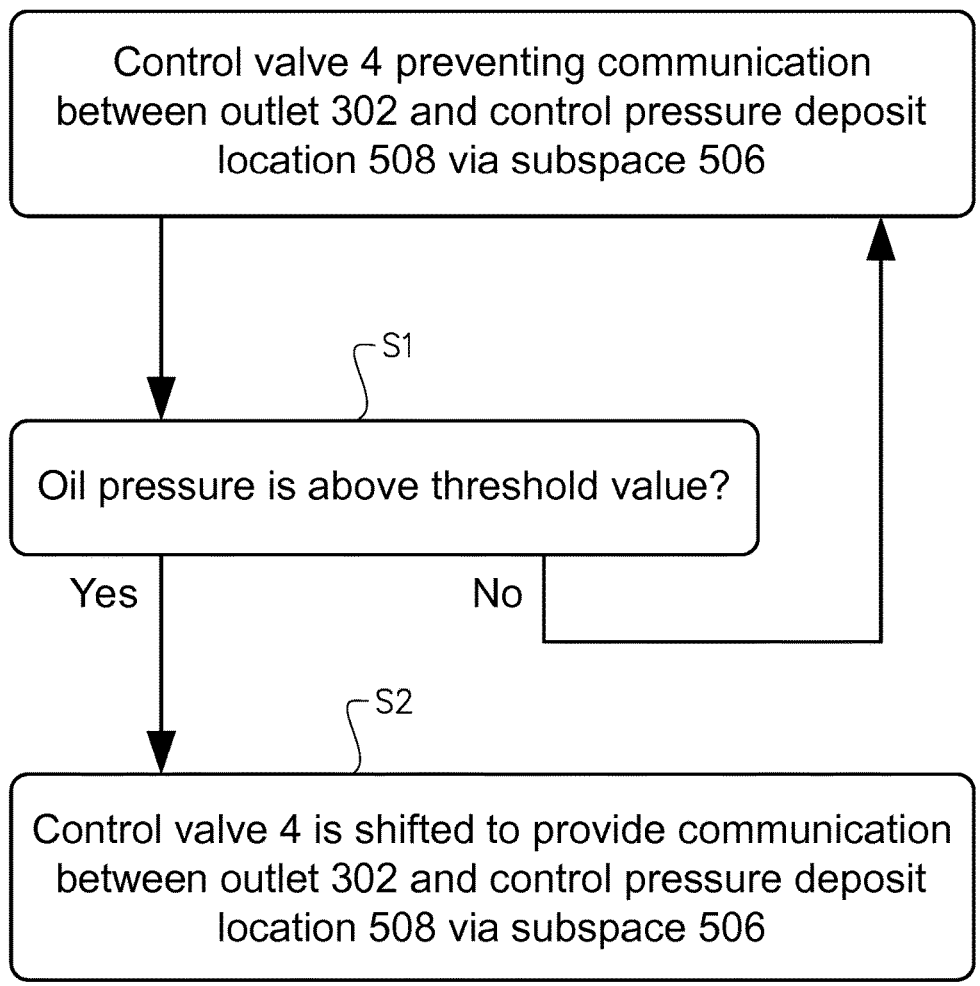
FIG. 5 depicts steps in an embodiment of a method according to the invention.

FIG. 5 depicts an example of a method according to the invention. In step S1 it is determined whether the oil pressure is above a threshold value. If the oil pressure is below the threshold value, the control valve 4 is left in a position in which it prevents communication between outlet 302 and the control pressure deposit location 508 via the subspace 506. If on the other hand the oil pressure is above the threshold value, the control valve 4 is shifted, S2, to a position in which it provides communication between outlet 302 and the control pressure deposit location 508 via the subspace 506.

Figure 6:
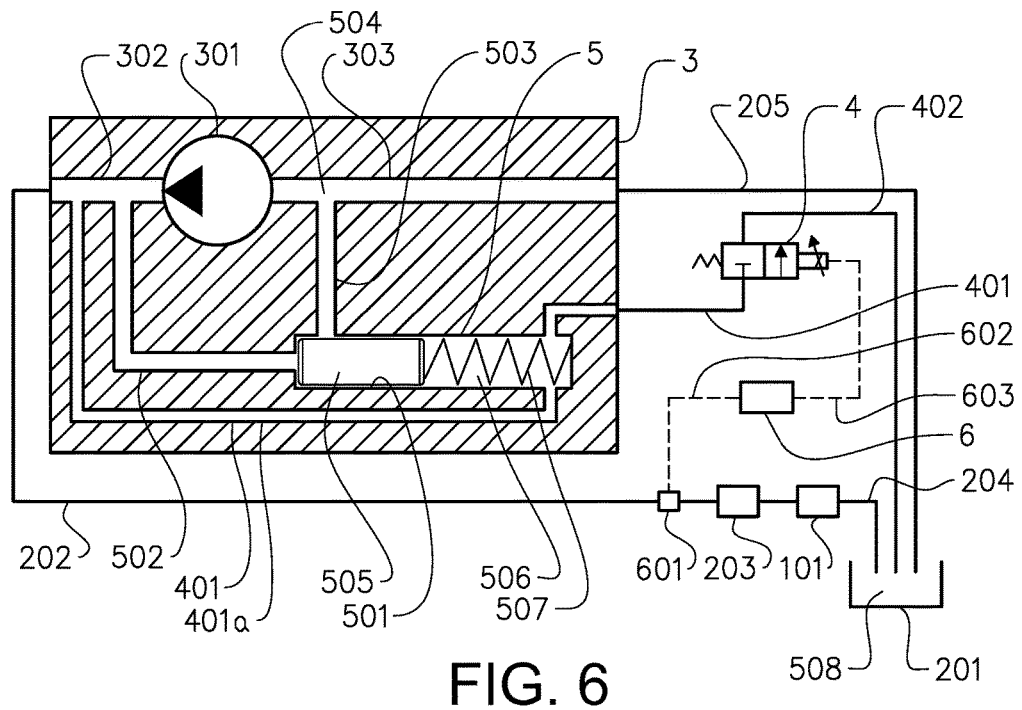
FIG. 6 shows an oil pump assembly according to an alternative embodiment of the invention, and devices with which it is adapted to interact with FIGS. 7 and 8 show a further embodiment of an oil pump assembly, and devices with which it is adapted to interact with, FIGS. 9 and 10 show additional embodiments of oil pump assemblies, and devices with which they are adapted to interact with, FIG. 11 shows a perspective view of parts of the internal combustion engine system in FIG. 2.

FIG. 6 shows an alternative embodiment in which the control pressure deposit location 508 is provided in the oil sump 201. Thus, the control pressure deposit passage 402 provides a communication between the control valve 4 and the oil sump 201. Thereby, the control valve 4 controls the communication between the outlet 302 and the oil sump 201. When the outlet 302 has a higher pressure than the oil sump 201, opening with the control valve 4 the connection between the subspace 506 and the oil sump 201 will provide a pressure difference across the plunger 505, which will urge it to move to the open position.

Figure 7:
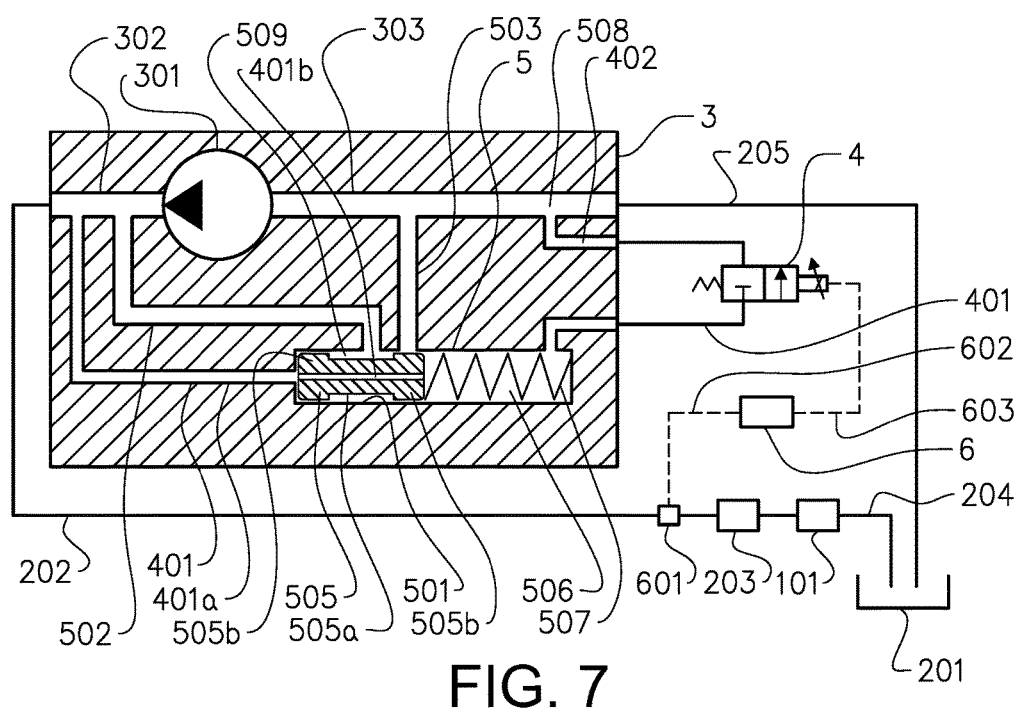

FIG. 7 shows an oil pump assembly according to a further embodiment of the invention. In this embodiment, the relief valve 5 is arranged so that a communication is provided in the valve chamber 501 between opposite sides of the plunger 505. Said the communication is provided by a cavity in the form of a bore 401b in the plunger 505. The plunger 505 has a cylindrical external surface, and the bore 401b is provided centrally and straight in the direction of movement of the plunger 505 between the closed and open positions.

Further, the control passage 401 presents an outlet control passage portion 401a connecting the outlet 302 with the valve chamber 501, on a side of the plunger 505 which is opposite to the subspace 506. When the control valve 4 blocks the communication between the subspace 506 and the inlet 303, the outlet pressure is provided to the subspace via the bore 401b, and therefore the pressure is equal on both sides of the plunger 505, assisting the spring 507 in keeping the plunger in the closed position.

The plunger 505 presents a recessed portion 505a between two end portions 505b of the plunger. In the recessed portion 505a the plunger is narrowed, and provides with the valve chamber 501 an intermediate space 509 between the end portions. As can be seen in FIG. 7, in the closed position the plunger 505 blocks, with one of the end portions 505b, the relief deposit passage 503. However, it can also be seen that the outlet relief passage 502 communicates with the intermediate space 509 in the closed position of the plunger 505.

Figure 8:
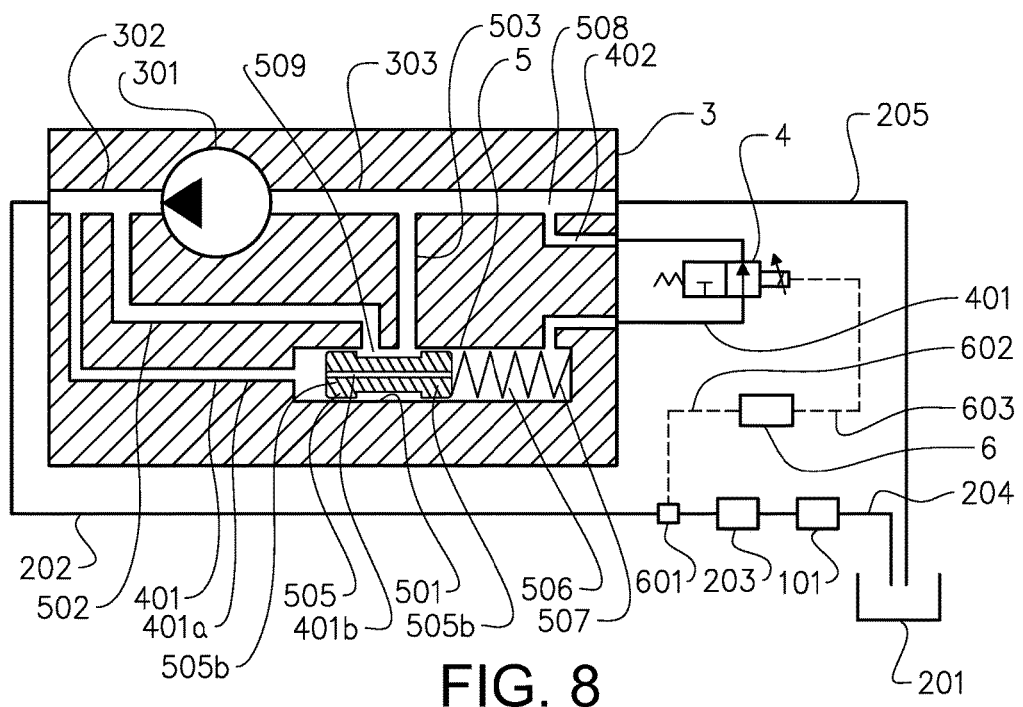

FIG. 8 shows the oil pump assembly in FIG. 7 when the control valve 4 is shifted so as to allow communication between the subspace 506 and the inlet 303. If the pressure in the inlet 303 is lower than in the outlet 302, the pressure in the subspace 506 will decrease upon said control valve shift, and the plunger 505 is urged from the closed position to the open position by pressure in the outlet control passage portion 401a. In the open position, the outlet relief passage 502 and the relief deposit passage 503 are both exposed to the intermediate space 509, and thereby, communication is allowed between them.

Figure 9:
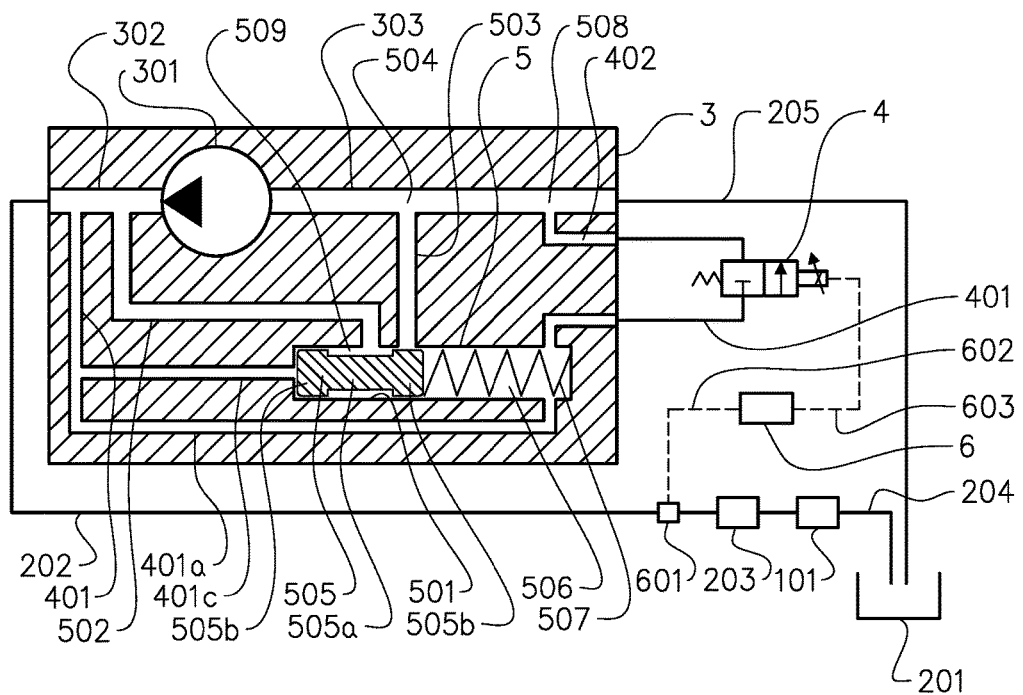

FIG. 9 shows an embodiment where the outlet control passage 401 is configured to communicate with the valve chamber 501 on opposite sides of the plunger 505. More specifically, the control passage 401 presents an outlet control passage portion 401a connecting the outlet 302 with the subspace 506. The control passage 401 also presents an outlet control passage branch 401c which is parallel to the outlet control passage portion 401a. The outlet control passage branch 401c connects the outlet 302 with the valve chamber on the side of the plunger 505 which is opposite to the subspace 506.

As in the example in FIGS. 7 and 8, the plunger 505 presents a recessed portion 505a between two end portions 505b, thus providing with the valve chamber 501 an intermediate space 509 between the end portions. In the closed position the plunger 505 blocks, with one of the end portions 505b, the relief deposit passage 503, but in the open position, the outlet relief passage 502 and the relief deposit passage 503 are both exposed to the intermediate space 509 so that communication is allowed between them.

When the control valve 4 in FIG. 9 blocks the communication between the subspace 506 and the inlet 303, the outlet pressure is provided to the subspace via the outlet control passage portion 401a, and therefore the pressure is equal on both sides of the plunger 505, assisting the spring 507 in keeping the plunger in the closed position. When the control valve 4 is shifted so as to allow communication between the subspace 506 and the inlet 303, if the pressure in the inlet 303 is lower than in the outlet 302, the pressure in the subspace 506 will decrease upon said control valve shift, and the plunger 505 is urged from the closed position to the open position by pressure in the outlet control passage branch 401c.

Figure 10:
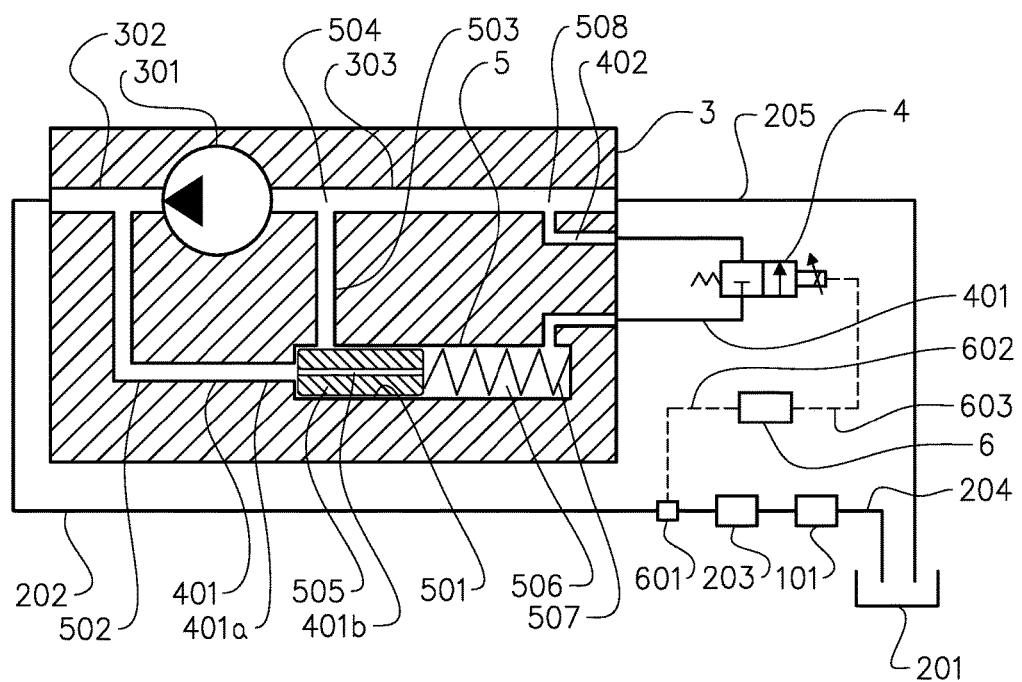

FIG. 10 shows an embodiment where the outlet relief passage 502 is provided by the control passage 401. In other words, the outlet relief passage 502 and the control passage 401 share the same conduit. Similarly to the embodiment in FIG. 7, a cavity in the form of a bore 401b in the plunger 505 provides communication between opposite sides of the plunger 505. When the control valve 4 blocks the communication between the subspace 506 and the inlet 303, the outlet pressure is provided to the subspace via the bore 401b, and therefore the pressure is equal on both sides of the plunger 505, assisting the spring 507 in keeping the plunger in the closed position. Thereby, the plunger 505 blocks the relief deposit passage 503.

When the control valve 4 in FIG. 10 is shifted so as to allow communication between the subspace 506 and the inlet 303, if the pressure in the inlet 303 is lower than in the outlet 302, the pressure in the subspace 506 will decrease upon said control valve shift, and the plunger 505 is urged from the closed position to the open position by pressure in the combined outlet relief passage 502 and control passage 401. In the open position, the relief deposit passage 503 is exposed to the valve chamber 501, and thereby communication is allowed between the relief deposit passage 503 and the combined outlet relief passage 502 and control passage 401.

Figure 11:
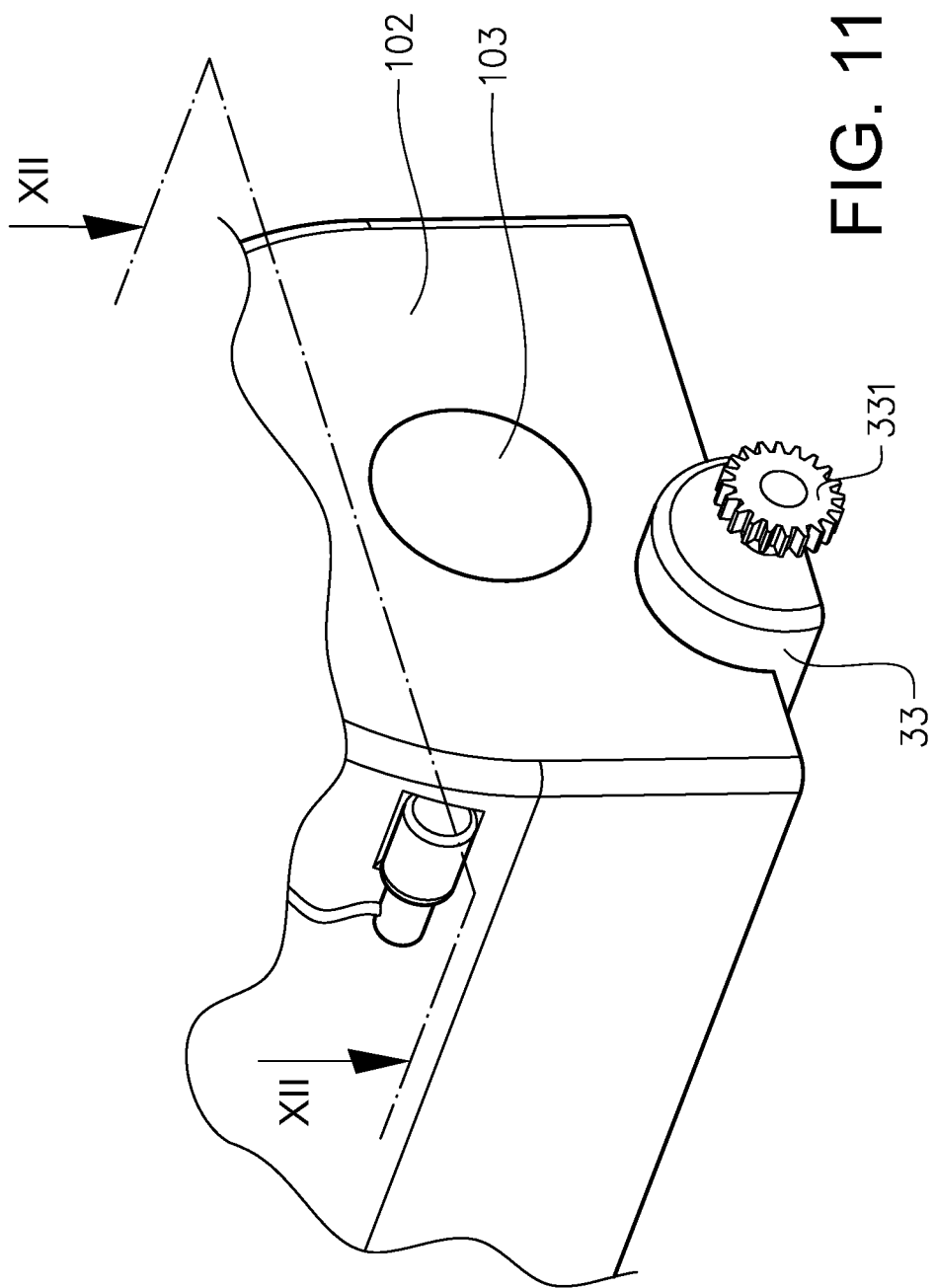
Figure 12:
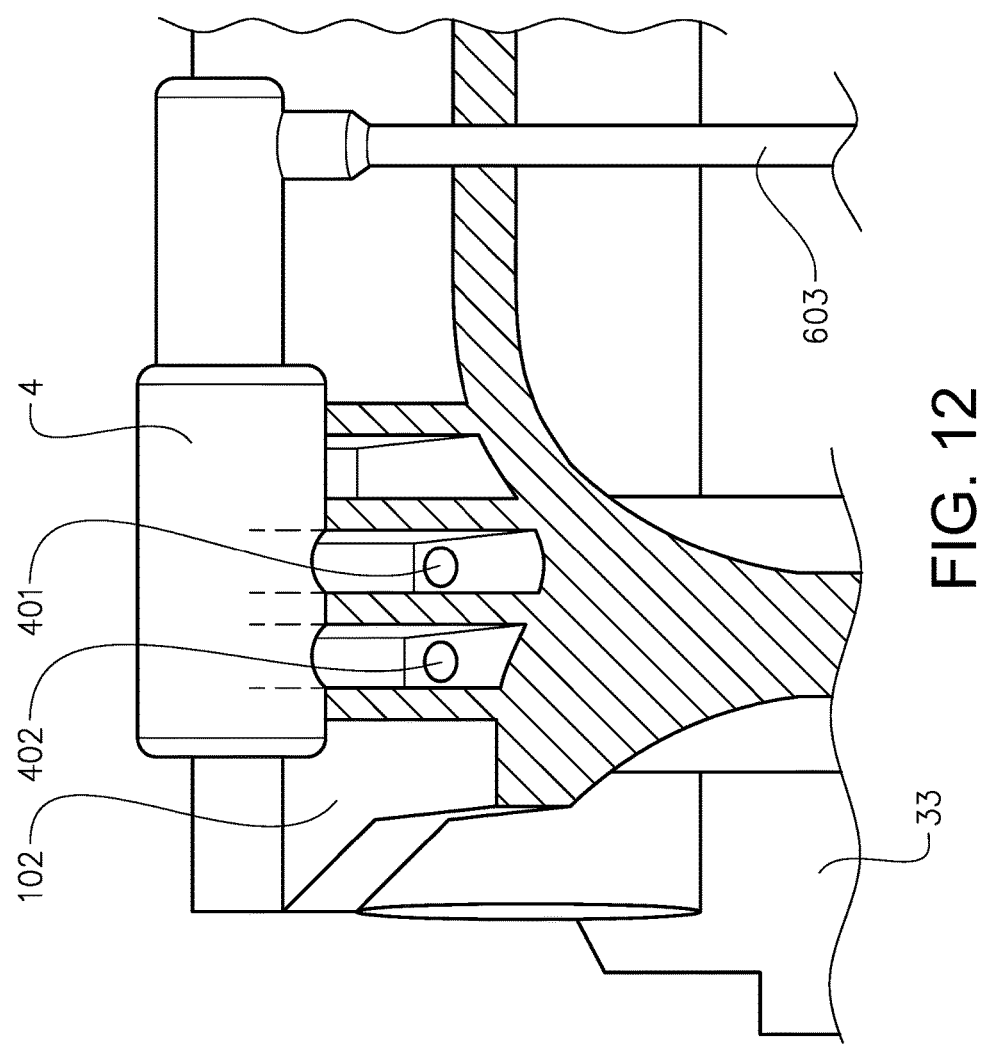
FIG. 12 shows a partial cross-section of the parts in FIG. 1, with the section oriented in a plane indicated with the broken lines XII-XII in FIG. 11.

A particular embodiment of the invention is indicated in FIG. 2, FIG. 11 and FIG. 12. In FIG. 11, a part of an engine block 102 of the internal combustion engine in FIG. 2. The oil pump 33, located in the oil sump 201, (not shown in FIG. 11), is mounted to a bottom side of the engine block 102. FIG. 11 also shows a part of the gear arrangement 331, via which the oil pump 33 is driven by the crankshaft, which protrudes through an opening 103 in a vertical face of the engine block 102. FIG. 11 also shows the control valve 4 of the oil pump assembly, located remotely from the oil pump 33, and mounted to the exterior of the engine block 102. As suggested in this location it can be easily accessed for service or replacement.

In FIG. 12 the control valve 4, provided as a proportional valve, is shown in a sectioned view. A part of the connection 603 to the control unit 6, (see e.g. FIG. 3), of the control valve 4 is shown. Also, the control passage 401 and the control pressure deposit passage 402 are provided as conduits in the engine block 102, and ends of these conduits are shown in FIG. 12.

Figure 13:
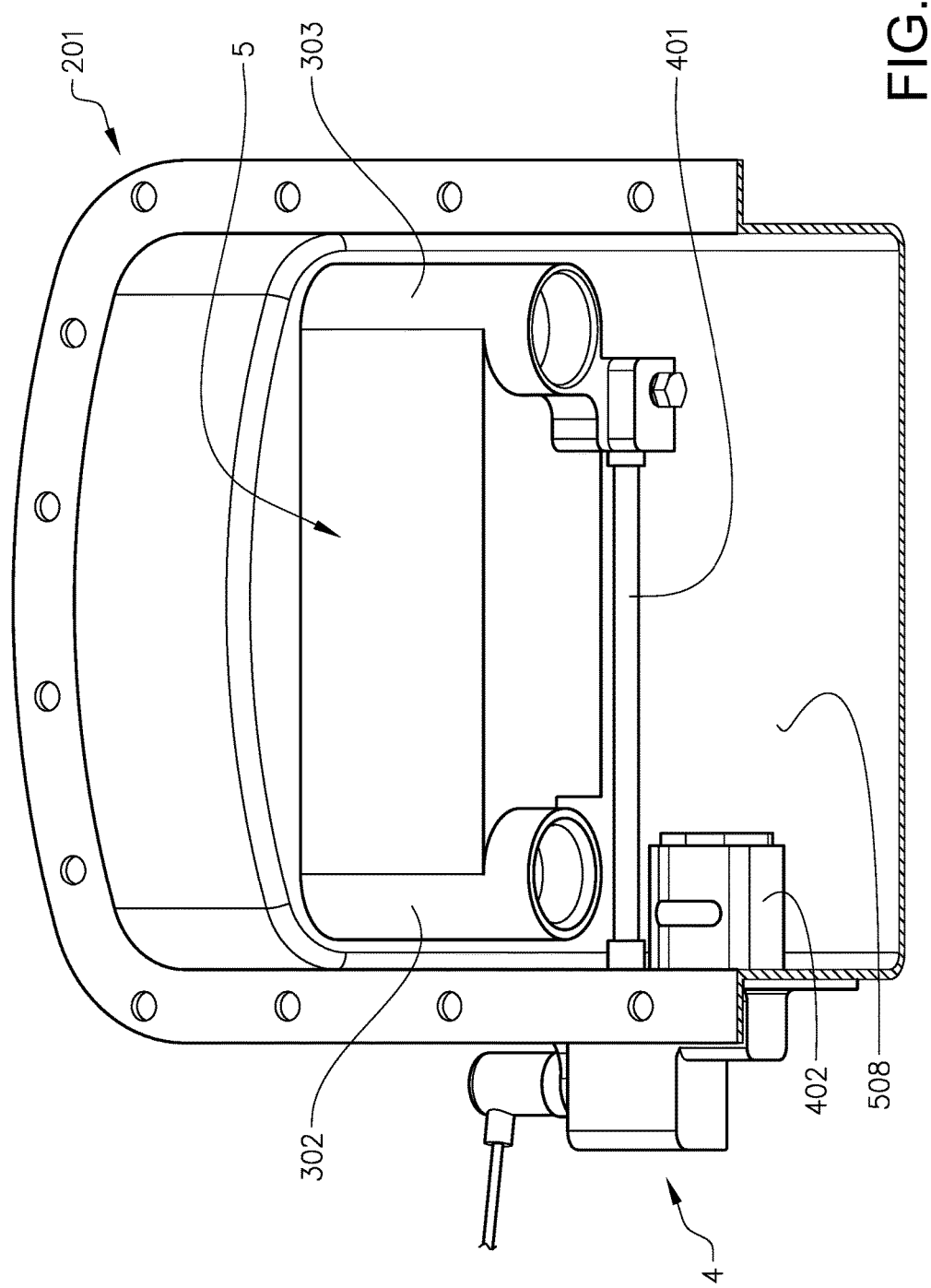
FIG. 13 shows a perspective view from above of an oil sump and parts of an oil pump assembly according to yet another embodiment of the invention.

FIG. 13 illustrates an alternative location of the control valve 4, mounted externally on the oil sump 201. The pump body of the oil pump, containing outlet 302, the inlet 303 and the relief valve 5, is shown. The part of the control passage 401 connecting the relief valve 5 with the control valve 4 is also shown. In this embodiment, similarly to the as shown in FIG. 6, the control pressure deposit location 508 is provided in the oil sump 201. Thus, the control pressure deposit passage 402 provides a communication between the control valve 4 and the oil sump 201.

Figure 14:
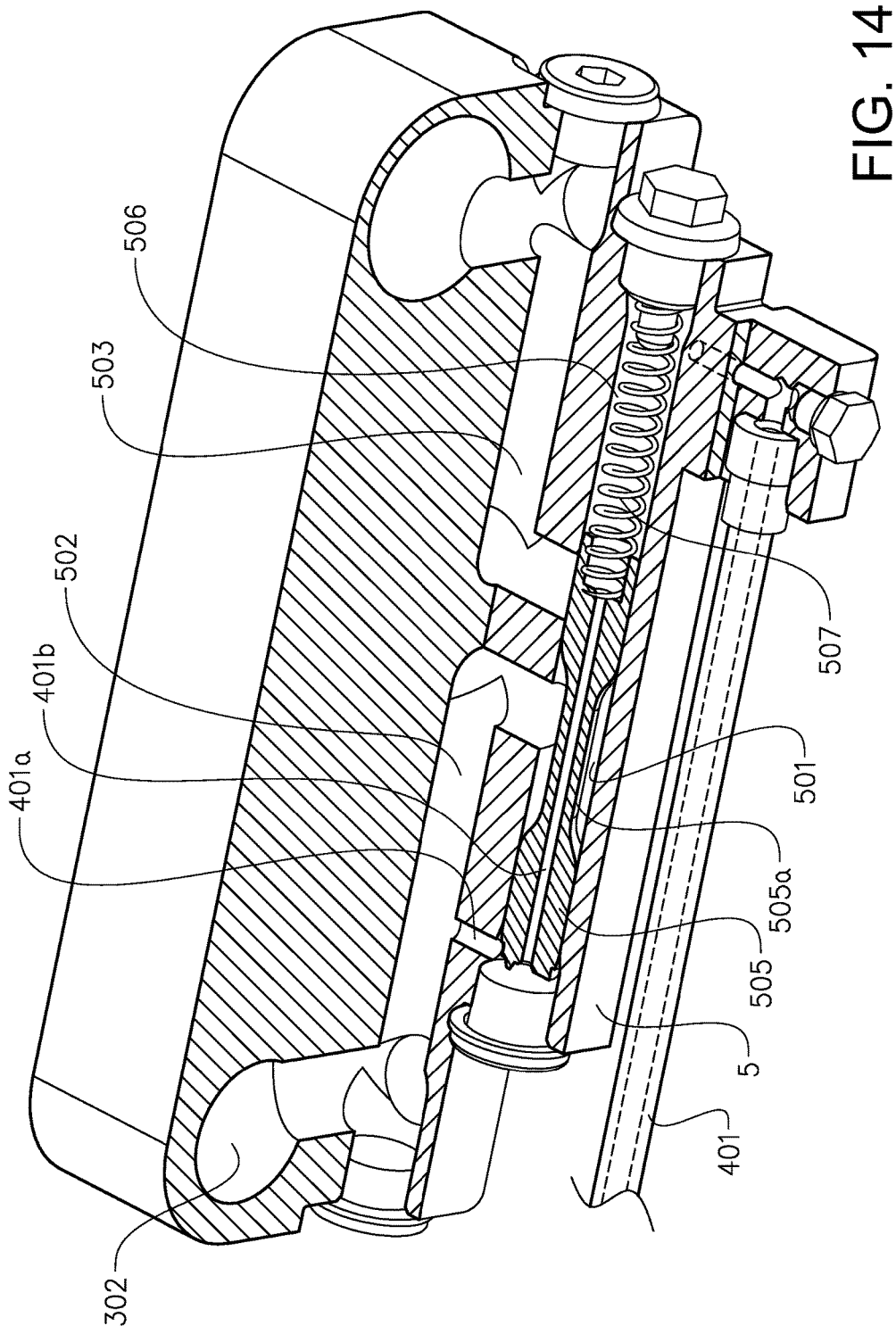
FIG. 14 is a perspective sectioned view of a part shown in FIG. 13.

FIG. 14 is a sectioned view of the pump body shown in FIG. 13. The relief valve 5 works with the same principle as the one described above with reference to FIGS. 7 and 8. Thus, the relief valve 5 is arranged so that a communication in the valve chamber 501 between opposite sides of the plunger 505 is provided by a cavity in the form of a bore 401b in the plunger 505. Further, an outlet control passage portion 401a connects the outlet 302 with the valve chamber 501, on a side of the plunger 505 which is opposite to the subspace 506. When the control valve 4 blocks the communication between the subspace 506 and the oil sump 201 (FIG. 13), the outlet pressure is provided to the subspace via the bore 401b, and therefore the pressure is equal on both sides of the plunger 505, assisting the spring 507 in keeping the plunger in the closed position.

As in FIG. 7, the plunger 505 presents a recessed, narrowed portion 505a between two end portions of the plunger, providing with the valve chamber 501 an intermediate space between the end portions. In the closed position the plunger 505 blocks, with one of the end portions 505b, the relief deposit passage 503. When the control valve 4 is shifted so as to allow communication between the subspace 506 and the oil sump 201, if the pressure in the oil sump 201 is lower than in the outlet 302, the pressure in the subspace 506 will decrease upon said control valve shift, and the plunger 505 is urged from the closed position to the open position by pressure in the outlet control passage portion 401a. In the open position, the outlet relief passage 502 and the relief deposit passage 503 are both exposed to the intermediate space provided by the narrowed portion 505a of the plunger, and thereby, communication is allowed between them.

Figure 15:
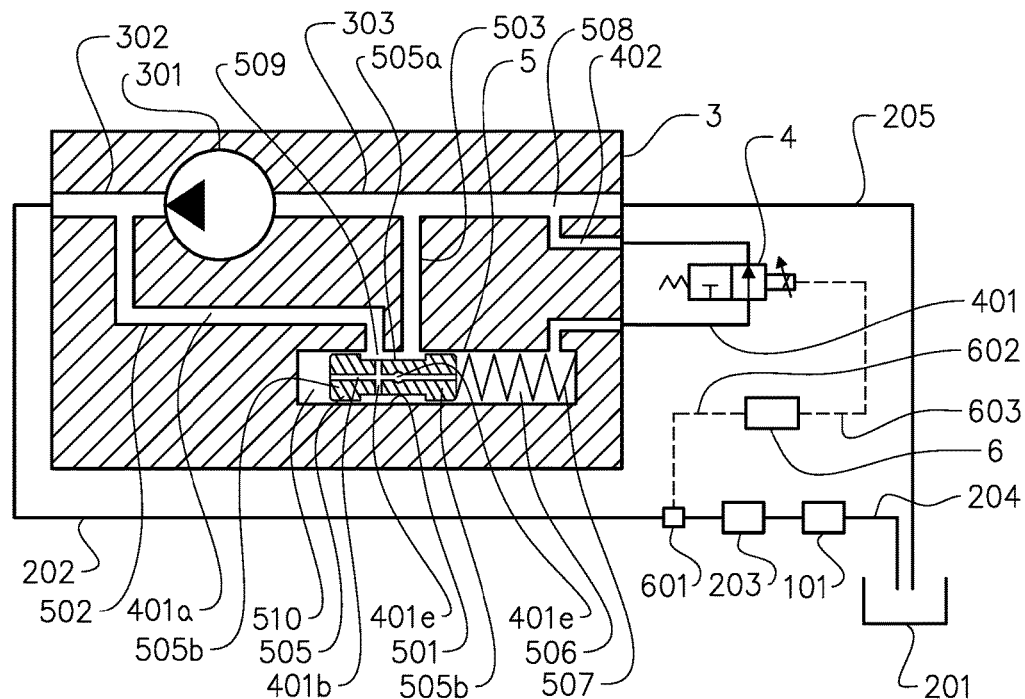
FIG. 15 shows yet another embodiment of an oil pump assembly, and devices with which it is adapted to interact with, FIG. 16 shows a perspective view of a part of an oil pump assembly sharing functions with the embodiment shown in FIG. 15.

FIG. 15 shows yet another embodiment of an oil pump assembly. As in embodiments described above, the valve chamber 501 presents an elongated, cylindrical shape and the plunger 505 is adapted to move in the longitudinal direction of the valve chamber 501. Similarly to the embodiment in FIGS. 7 and 8, the plunger in the embodiment in FIG. 15 presents a recessed portion 505a between two end portions 505b of the plunger so as to provide the valve chamber 501 with an intermediate space 509 between the end portions. The outlet relief passage 502 communicates with the intermediate space 509 in the valve chamber.

The relief valve 5 is arranged so that a communication 401b, 401e is provided in the valve chamber 501 between the intermediate space 509 and a pressure space 510 in the valve chamber, which pressure space 510 is delimited by the plunger 505 and is opposite to the subspace 506. The communication 401b, 401e between the intermediate space 509 and the pressure space 510 is provided by cavities formed by three bores 401b, 401e in the plunger.

Said bores include a bore 401b extending in the longitudinal direction of the valve chamber 501, from the pressure space 510 to the subspace 506. Two additional bores 401e, (one of which extends perpendicularly to the plane of the drawing), each extend through the recessed portion 505a of the plunger. Each additional bore 401e extends transversely to and intersects the bore 401b extending in the longitudinal direction of the valve chamber.

The bore 401b extending in the longitudinal direction of the valve chamber provides a communication 401b between opposite sides of the plunger 505. Also, the bores 401b, 401e provide a communication between the intermediate space 509 and the pressure space 510 as well as a communication between the intermediate space 509 and the subspace 506.

The arrangement of said bores 401b, 401e provides for the outlet relief passage 502 being provided by the control passage 401. More specifically, the outlet relief passage 502 and a control passage portion 401a are combined into a single conduit between the pump outlet 301 and the relief valve 5. The combined outlet relief passage 502 and control passage portion 401a communicates with the valve chamber 501 at a location between ends of the cylinder presented by the valve chamber 501, and more specifically with the intermediate space 509 provided by the recessed portion 505a of the plunger 505.

When the control valve 4 is closed, the pressure on opposite sides of the plunger 505 is equalised due to the bore 401b extending in the longitudinal direction of the valve chamber 501, from the pressure space 510 to the subspace 506. Thereby the relief valve 5 is kept in the closed position by the spring 507, in which one of the plunger end portions 505b blocks the communication between the valve chamber 501 and the relief deposit passage 503.

When the control valve 4 is opened the communication between the control pressure deposit location 508 and the subspace 506 creates a pressure difference across the plunger 505 which moves the latter against the spring force to expose the relief deposit passage 503 to the intermediate space 509. This allows a communication between the outlet relief passage 502 and the relief deposit passage 503. Said bores 401b, 401e are preferably sized with cross-sections which are small enough for a relatively low flow from the intermediate space 509 to the subspace 506 in the open position of the control valve 4, but large enough to avoid debris blocking the bores.

Combining the outlet relief passage 502 and the control passage portion 401a into a single conduit between the pump outlet 301 and the relief valve 5 simplifies manufacturing of the oil pump assembly, since machining steps for providing a conduit can be omitted.

Figure 16:
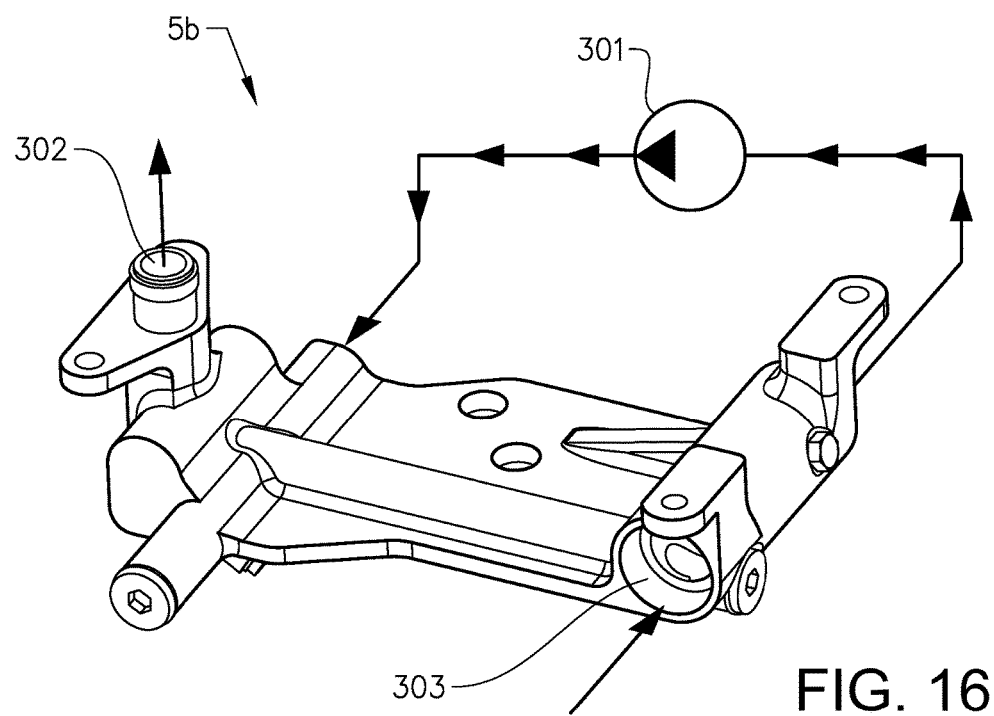
Figure 17:
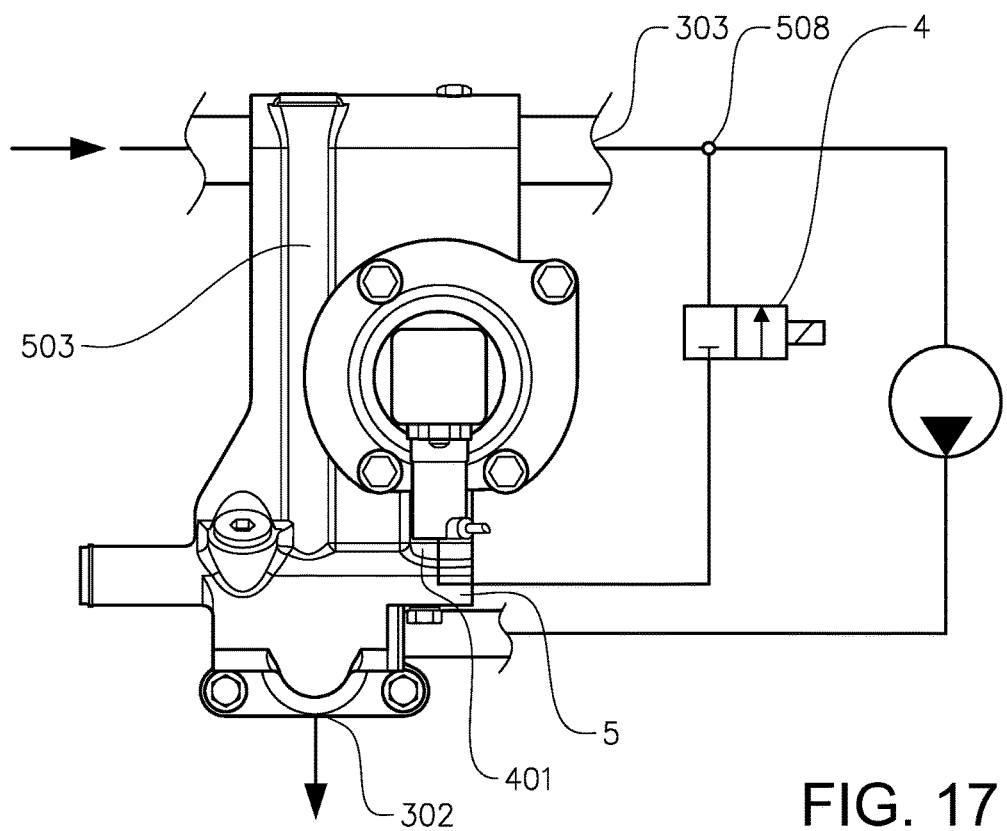
FIG. 17 shows a view from underneath of the part shown in FIG. 16.
Figure 18:
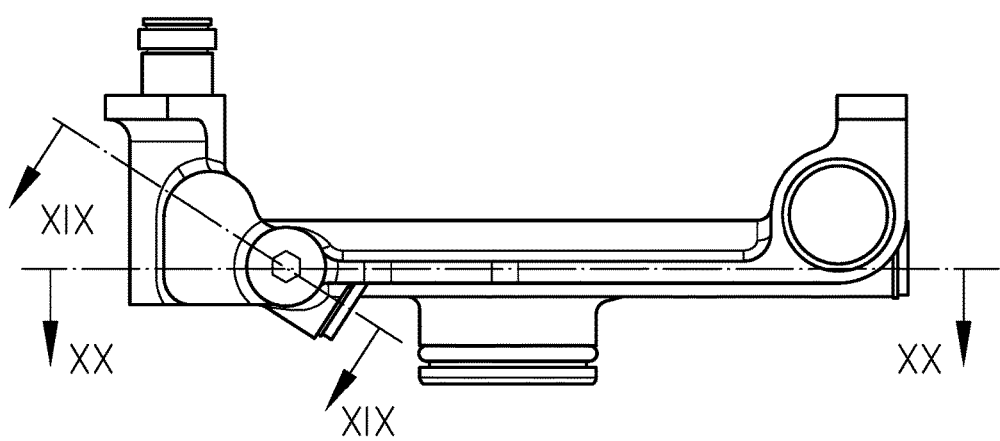
FIG. 18 shows a side view of the part shown in FIG. 16.

FIG. 16 shows a valve housing 5b of an oil pump assembly sharing functions with the embodiment shown in FIG. 15. The valve housing comprises portions of a pump inlet 303 and a pump outlet 302, which are arranged to be connected to a pump 301. As can be seen in FIG. 17, and in principle as described with reference to FIG. 15, a relief valve 5 is arranged to communicate with the pump inlet 303 via a relief deposit passage 503, and to communicate with a control valve 4 via a control passage 401.

Figure 19:
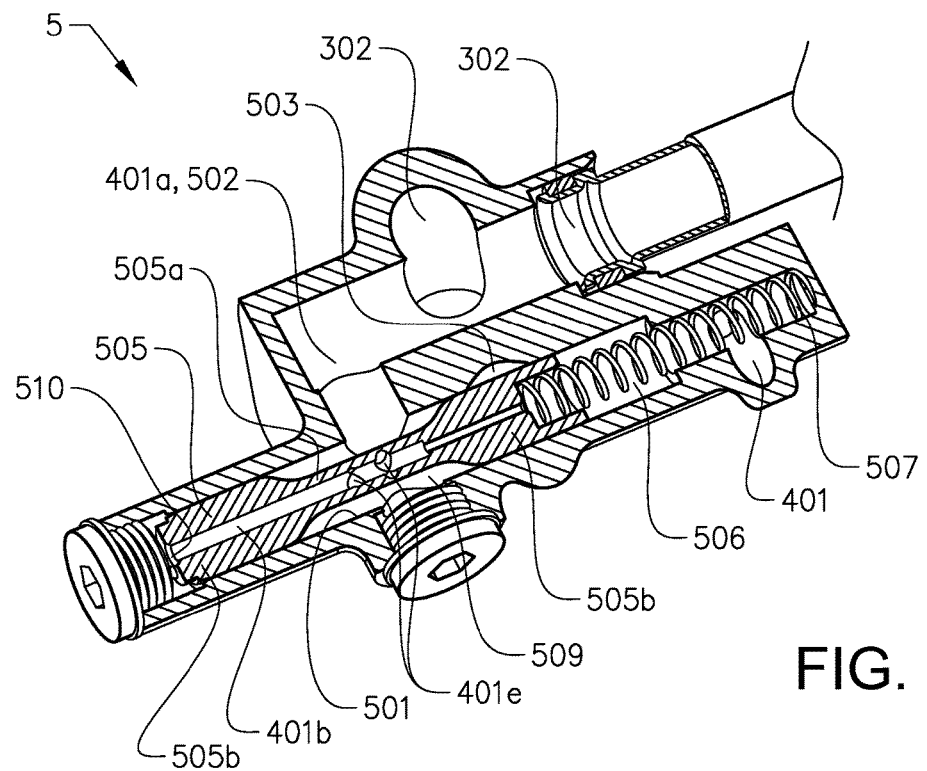
FIG. 19 shows a cross-sectional view with the section oriented as indicated with the arrows XIX-XIX in FIG. 18.

As can be seen in FIG. 19, the release valve 5 presents a cylindrically shaped and elongated valve chamber 501, and a plunger 505 adapted to be biased towards one end of the valve chamber 501 with a spring 507. As in FIG. 15, the plunger presents a recessed portion 505a between two end portions 505b of the plunger so as to provide the valve chamber 501 with an intermediate space 509 between the end portions. A combined outlet relief passage 502 and control passage portion 401a provides a communication between the pump outlet 302 and the intermediate space 509.

Also, as in FIG. 15, the plunger 505 is provided with a cavity in the form of a bore 401b extending from the pressure space 510 to the subspace 506, and cavities formed by two additional bores 401e each extend through the recessed portion 505a of the plunger to intersect the bore 401b extending in the longitudinal direction of the valve chamber.

Figure 20:
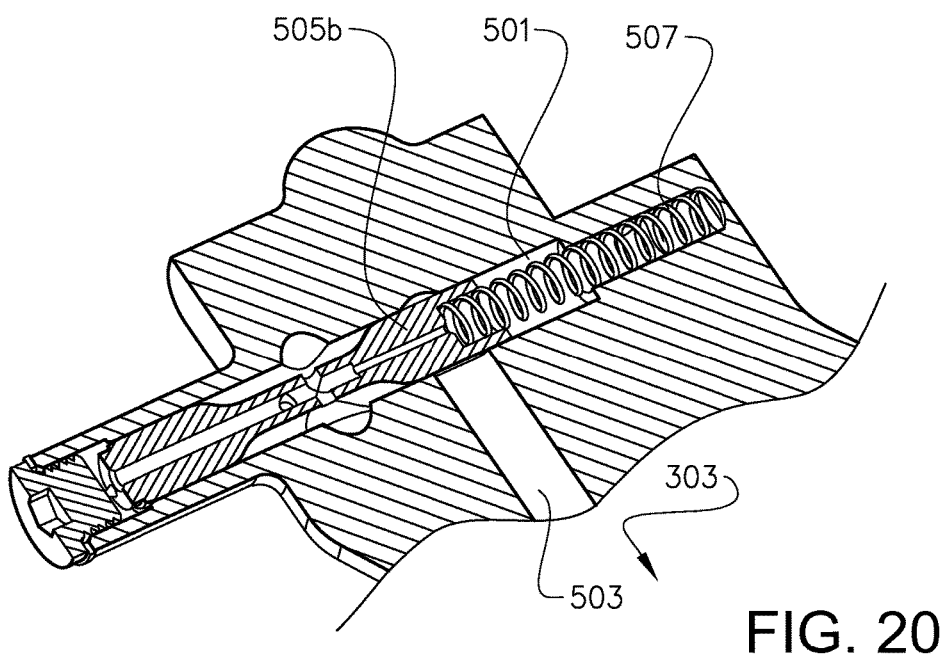
FIG. 20 shows a cross-sectional view with the section oriented as indicated with the arrows XX-XX in FIG. 18, FIG. 21-FIG. 23 show oil pump assemblies according to further embodiments of the invention.

FIG. 20 shows the relief deposit passage 503 extending from the valve chamber 501 towards the pump inlet. As in FIG. 15, when the control valve 4 is closed, the relief valve 5 is kept in the closed position by the spring 507, in which one of the plunger end portions 505b blocks the communication between the valve chamber 501 and the relief deposit passage 503.

As can be best understood from FIGS. 17 and 19, when the control valve 4 is opened, the communication between the control pressure deposit location 508, in this example provided in the pump inlet 303, and the subspace 506 creates a pressure difference across the plunger 505 which moves the latter against the spring force to expose the relief deposit passage 503 to the intermediate space 509. This allows a communication between the outlet relief passage 502 and the relief deposit passage 503.

As can be seen in FIG. 19, the bore 401b extending from the pressure space 510 to the subspace 506 presents, between the subspace 506 and the bores 401e extending through the recessed portion 505a, a narrower diameter than elsewhere in the bores 401b, 401e. This narrower diameter is approximately 2.0-3.0 mm, and is thereby small enough for a relatively low flow from the intermediate space 509 to the subspace 506 in the open position of the control valve 4, but large enough to avoid debris blocking the bore.

Combining the outlet relief passage 502 and the control passage portion 401a into a single conduit between the pump outlet 301 and the relief valve 5 simplifies manufacturing of the oil pump assembly, since machining steps for providing a conduit can be omitted.

Figure 21:
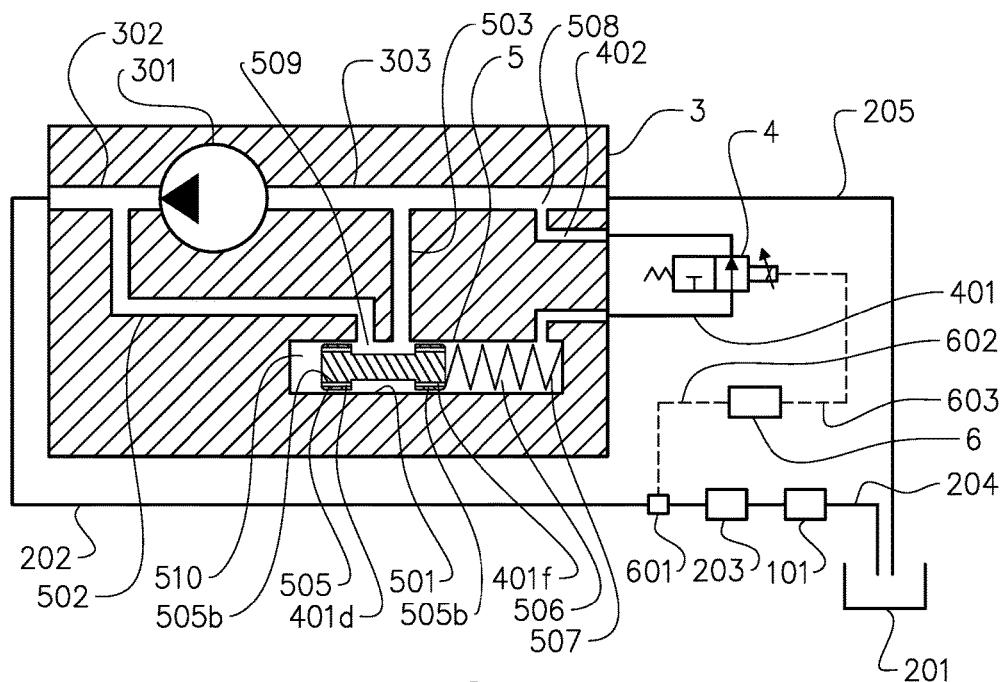

FIG. 21 depicts a further embodiment of the invention. It is similar to the embodiment described with reference to FIG. 15. However, here the bores 401d, 401f providing the communication 401d between the intermediate space 509 and the pressure space 510, and between the intermediate space 509 and the subspace 506, all extend in parallel with the direction of movement of the plunger 505 in the valve chamber 501. The bores 401d, 401f are provided in the end portions 505b of the plunger, radially outside the recessed portion 505a of the plunger.

The embodiment in FIG. 21 allows for the plurality of bores 401d, 401f to be parallel, which facilitates manufacturing of the plunger, since the latter can be kept in the same orientation during machining of said bores.

Figure 22:
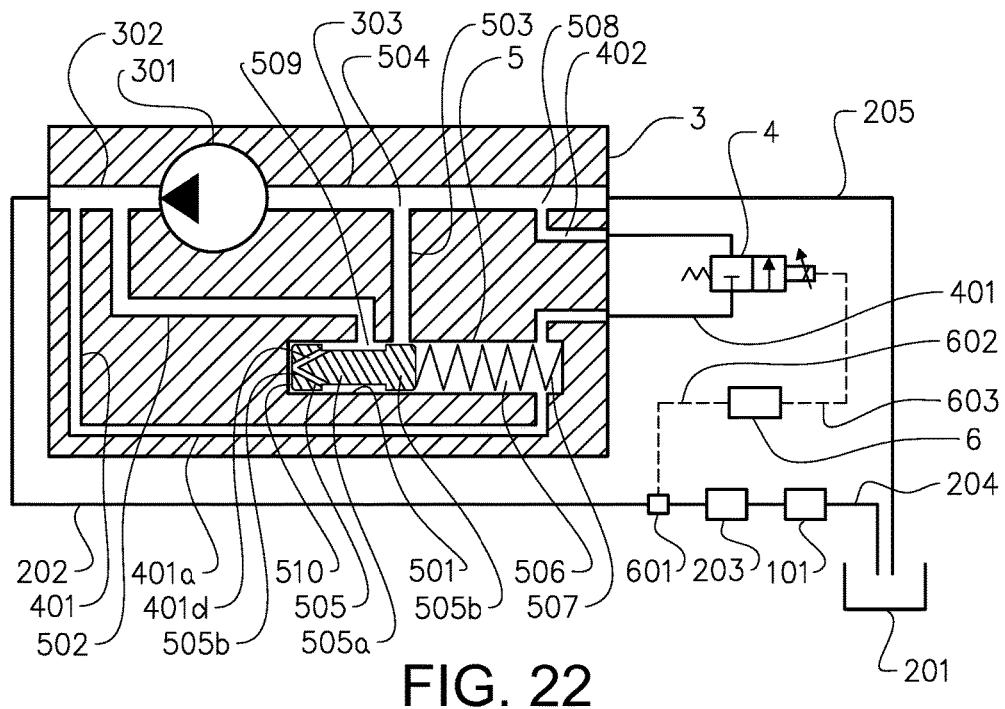
Figure 23:
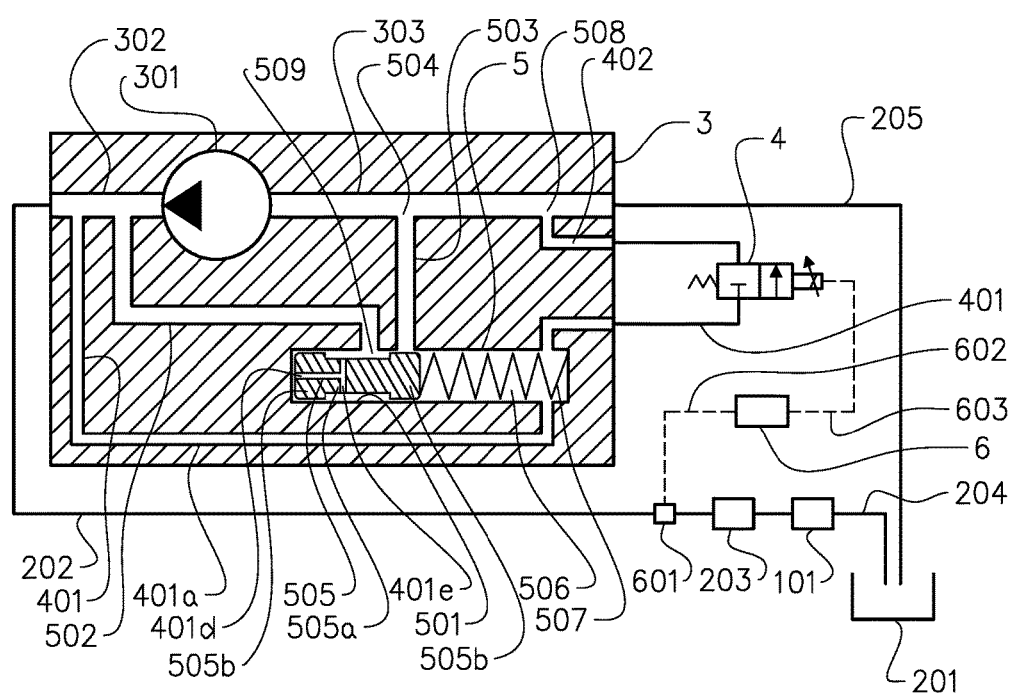

In the embodiment in FIGS. 22 and 23, bores 401d, 401e in the plunger 505 provide a communication between the intermediate space 509 and the pressure space 510, but not between the intermediate space 509 and the subspace 506. Instead, as in the embodiments described above with reference to FIG. 3, FIG. 4, FIG. 6 and FIG. 9, a communication between the outlet 302 and the subspace 506 is provided by an outlet control passage portion 401a.

Figure 24:
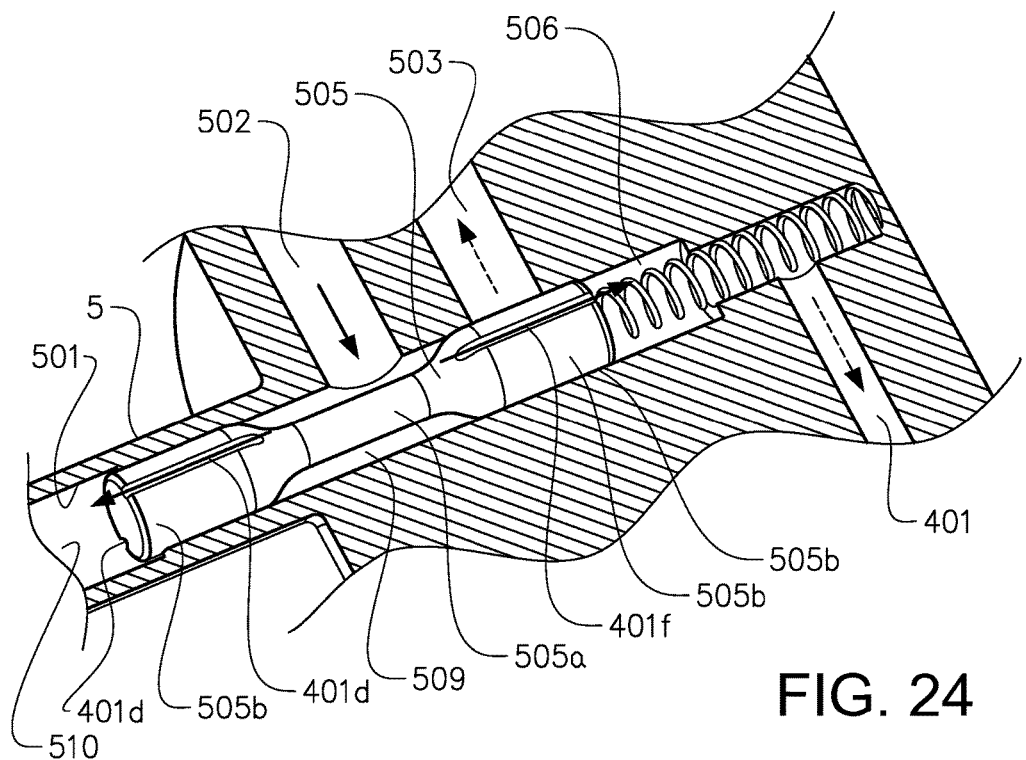
FIG. 24 shows a partially sectioned, perspective view of a part of an oil pump assembly according to a further embodiment of the invention.
Figure 25:
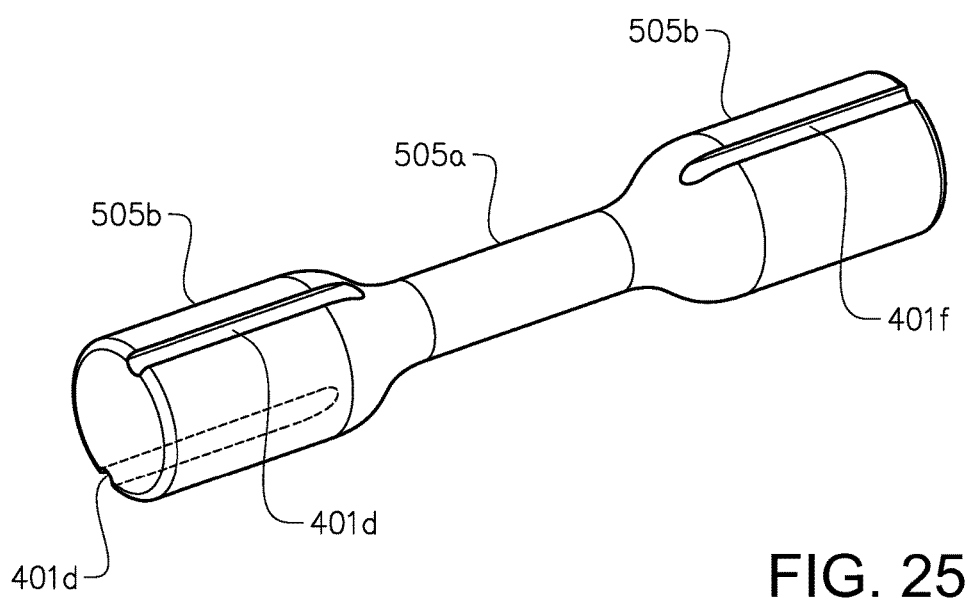
FIG. 25 shows a detail in FIG. 24.

FIGS. 24 and 25 depict a further embodiment of the invention. In the embodiments described above, the cavities in the plunger have been provided in the form of bores. In the embodiment in FIGS. 24 and 25, the cavities are instead provided as elongated recesses 401d, 401f on the plunger surface forming respective conduits with the surface of the valve chamber 501.

The embodiment in FIGS. 24 and 25 is similar to the embodiment described with reference to FIG. 21. The recesses 401d, 401f providing the communication 401d between the intermediate space 509 and the pressure space 510, and between the intermediate space 509 and the subspace 506, all extend in parallel with the direction of movement of the plunger 505 in the valve chamber 501. The recesses 401d, 401f are provided in the surfaces of the end portions 505b of the plunger, radially outside the recessed portion 505a of the plunger.

The embodiment in FIGS. 24 and 25 facilitates manufacturing of the plunger, since the parallel recesses 401d, 401f are easy to provide during machining of the plunger. Preferably, the plunger 505 is oriented in the valve chamber 501 such that none of the recesses are exposed to the relief deposit passage 503 in the closed position of the relief valve 5.

The invention claimed is:

1. An oil pump assembly for a vehicle lubrication system comprising a pumping device, the oil pump assembly presenting an outlet leading from the pumping device, and an inlet leading to the pumping device, the oil pump assembly further comprising a relief valve presenting a valve chamber arranged to communicate via an outlet relief passage with the outlet, and to communicate via a relief deposit passage with a relief deposit location, the relief valve further comprising a plunger located in the valve chamber, the plunger being movable between a closed position, in which communication between the outlet relief passage and the relief deposit passage is prevented, and an open position, in which communication between the outlet relief passage and the relief deposit passage is provided, the oil pump assembly further comprising a control valve for controlling the relief valve, a control passage adapted to provide a communication between the outlet and the control valve via the valve chamber.

2. An assembly according to claim 1, wherein the control valve is configured to communicate a control pressure deposit location, whereby the control valve is arranged to control a communication between the outlet and the control pressure deposit location via the valve chamber.

3. An assembly according to claim 2, wherein the control pressure deposit location is provided in the inlet.

4. An assembly according to claim 2, wherein the control pressure deposit location is provided in an oil sump of the lubrication system.

5. An assembly according to claim 1, wherein the outlet relief passage and the control passage are configured to communicate with the valve chamber on opposite sides of the plunger.

6. An assembly according to claim 1, wherein the relief valve is configured so that the plunger can be urged from the closed position to the open position by pressure in the control passage.

7. An assembly according to claim 6, wherein the control passage is configured to communicate with the valve chamber on opposite sides of the plunger.

8. An assembly according to claim 6, wherein the outlet relief passage is provided by the control passage.

9. An assembly according to claim 1, wherein the relief valve is arranged so that a communication is provided in the valve chamber between opposite sides of the plunger.

10. An assembly according to claim 9, wherein the communication in the valve chamber between opposite sides of the plunger is provided by a bore in the plunger.

11. An assembly according to claim 1, wherein the plunger presents a recessed portion between two end portions of the plunger so as to provide with the valve chamber an intermediate space between the end portions.

12. An assembly according to claim 1, wherein the relief valve comprises an elastic element, which elastic element is configured to exert a closing force on the plunger towards the closed position.

13. An assembly according to claim 12, wherein the control passage presents an outlet control passage portion connecting the outlet with the valve chamber, the relief valve being arranged so that a pressure via the outlet control passage portion and/or the outlet relief passage can exert an opening force against the closing force of the elastic element.

14. An assembly according to claim 12, wherein the plunger is configured to delimit a subspace of the valve chamber, in which subspace the elastic element is located.

15. An assembly according to claim 14, wherein the control valve is configured to communicate with a control pressure deposit location, and the control valve is arranged to control a communication between the outlet and the control pressure deposit location via the subspace.

16. An assembly according to claim 1, wherein the control valve is not arranged to isolate the outlet from the valve chamber.

17. An assembly according to claim 1, wherein the plunger presents a recessed portion between two end portions of the plunger so as to provide the valve chamber with an intermediate space between the end portions, wherein the plunger is configured to delimit, on one side of the plunger, a subspace in the valve chamber, and, opposite to the subspace, a pressure space in the valve chamber, and wherein the control valve is arranged to communicate with the subspace, and the relief valve is arranged so that a communication is provided in the valve chamber between the intermediate space and the pressure space.

18. An assembly according to claim 17, wherein the communication between the intermediate space and the pressure space is provided by at least one cavity in the plunger.

19. An assembly according to claim 18, wherein the at least one cavity providing the communication between the intermediate space and the pressure space extends in parallel with a direction of movement of the plunger in the valve chamber.

20. An assembly according to claim 18, wherein at least one of the at least one cavity providing the communication between the intermediate space and the pressure space extends perpendicularly to a direction of movement of the plunger in the valve chamber.

21. An assembly according to claim 17, wherein the relief valve is arranged so that communication is provided in the valve chamber between opposite sides of the plunger, and wherein the outlet relief passage is provided by the control passage.

22. An assembly according to claim 21, wherein the communication (401d) between the intermediate space and the pressure space, and the communication between opposite sides of the plunger are provided by at least one cavity (401b, 401d, 401e, 401f) preferably at least two cavities, in the plunger.

23. An assembly according to claim 22, wherein the cavities are provided in the end portions of the plunger, radially outside the recessed portion of the plunger.

24. An assembly according to claim 23, wherein the cavities are elongated and parallel.

25. An assembly according to claim 22, wherein the cavities include at least one cavity extending in a longitudinal direction of the valve chamber, from the pressure space to the subspace, and at least one cavity extending through the recessed portion of the plunger, transversely to and intersecting the at least one cavity extending in the longitudinal direction of the valve chamber.

26. An assembly according to claim 22, wherein at least one of the at least one cavity providing the communication between intermediate space and the subspace is a bore with a diameter of 0.5-5.0 mm, preferably 2.0-3.0 mm.

27. An assembly according to claim 1, wherein the relief deposit location is provided in the inlet.

28. An assembly according to claim 1, wherein the control valve is a proportional valve.

29. An assembly according to claim 1, comprising a pump body housing the pumping device, the pump body presenting the outlet leading from the pumping device, and the inlet leading to the pumping device, wherein the control valve is spatially located externally of the pump body.

30. An internal combustion engine system comprising an internal combustion engine and an oil pump assembly according to claim 1, wherein the control valve is mounted externally on the internal combustion engine comprising lubricated devices served by the oil pump arrangement.

31. A method of controlling an oil pump assembly according to claim 1, comprising determining a value of a lubrication parameter indicative of the operation of the vehicle lubrication system, and controlling, at least partly based on the determined lubrication parameter value, the control valve so as to control the communication between the outlet and the control pressure deposit location via the subspace.

32. A computer comprising a computer program for performing the steps of claim 31 when the program is run on the computer.

33. A non-transitory computer readable medium carrying a computer program for performing the steps of claim 31 when the program product is run on a computer.

34. A controller configured to perform the steps of the method according to claim 31.

* * * * *